United States Patent
Marando et al.

(10) Patent No.: US 12,373,518 B2
(45) Date of Patent: Jul. 29, 2025

(54) MANAGING OWNERSHIP OF AN ELECTRONIC DEVICE

(71) Applicant: Microchip Technology Incorporated, Chandler, AZ (US)

(72) Inventors: Eileen Marando, Bellmore, NY (US); Richard Wahler, Saint James, NY (US); Arun Krishnan, Smithtown, NY (US); Randy Goldberg, Massapequa, NY (US)

(73) Assignee: Microchip Technology Incorporated, Chandler, AZ (US)

( * ) Notice: Subject to any disclaimer, the term of this patent is extended or adjusted under 35 U.S.C. 154(b) by 354 days.

(21) Appl. No.: 18/114,261

(22) Filed: Feb. 26, 2023

(65) Prior Publication Data
US 2023/0273977 A1    Aug. 31, 2023

Related U.S. Application Data

(60) Provisional application No. 63/314,428, filed on Feb. 27, 2022.

(51) Int. Cl.
G06F 21/00 (2013.01)
G06F 21/10 (2013.01)

(52) U.S. Cl.
CPC ...... *G06F 21/10* (2013.01); *G06F 2221/2129* (2013.01)

(58) Field of Classification Search
None
See application file for complete search history.

(56) References Cited

U.S. PATENT DOCUMENTS

| | | | |
|---|---|---|---|
| 2002/0124170 A1* | 9/2002 | Johnson, Jr. | G06F 21/6218 713/176 |
| 2011/0066835 A1* | 3/2011 | Kothari | G06F 11/3648 713/2 |
| 2014/0205092 A1* | 7/2014 | Hartley | H04L 9/0877 380/44 |

(Continued)

OTHER PUBLICATIONS

International Search Report and Written Opinion, Application No. PCT/US2023/013975, 11 pages, Jun. 1, 2023.

*Primary Examiner* — Shin-Hon (Eric) Chen
(74) *Attorney, Agent, or Firm* — SLAYDEN GRUBERT BEARD PLLC

(57) ABSTRACT

A device with one-time-programmable (OTP) memory, boot code, volatile memory, and non-volatile memory. Boot code may use information in OTP to authenticate code of an implicit owner of the electronic device; receive a first create owner container request; create a first owner container comprising a first signed data image; store the first owner container; and use the first signed data image to authenticate first executable code associated with the first owner. Boot code may transfer ownership from the first owner to a second owner, including authenticating a signed transfer of ownership command using a key stored in the first owner container and creating a second owner container comprising a second signed data image associated with the second owner; storing the second owner container; revoking the first owner container; and using the second signed data image to authenticate second executable code associated with the second owner of the electronic device.

19 Claims, 14 Drawing Sheets

1. CO may send Machine A serial number to TIE and NO (if NO is known)

2. TIE may send OTAKpub1 key to CO

3. CO may run ENABLE_UNRESTRICTED_TRANSFERS command passing OTAKpub1 key as new OTAK public key 4. CO may send Machine A to TIE 5. NO may send OTAKpub2 key to TIE 6. TIE may run UPDATE_OTAK_KEY command passing OTAKpub2 key as new OTAK public key (TIE signs command with OTAKpriv1 key)

7. TIE may send Machine A to NO

8. NO may run UPDATE_CONTAINER_REQUEST with "transfer ownership" sub-command (NO signs command with OTAKpriv2 key)

(56) References Cited

U.S. PATENT DOCUMENTS

| | | | |
|---|---|---|---|
| 2017/0090909 A1* | 3/2017 | Guo | G06F 8/66 |
| 2020/0293698 A1 | 9/2020 | Sion | |
| 2021/0192050 A1* | 6/2021 | Hird | G06F 21/606 |
| 2021/0357537 A1* | 11/2021 | Alon | G06F 21/577 |
| 2022/0060313 A1 | 2/2022 | Egranov et al. | |
| 2022/0382872 A1* | 12/2022 | Sakib | H04L 9/3247 |
| 2023/0078058 A1* | 3/2023 | Mitchell | G06F 21/575 |
| | | | 726/22 |

* cited by examiner

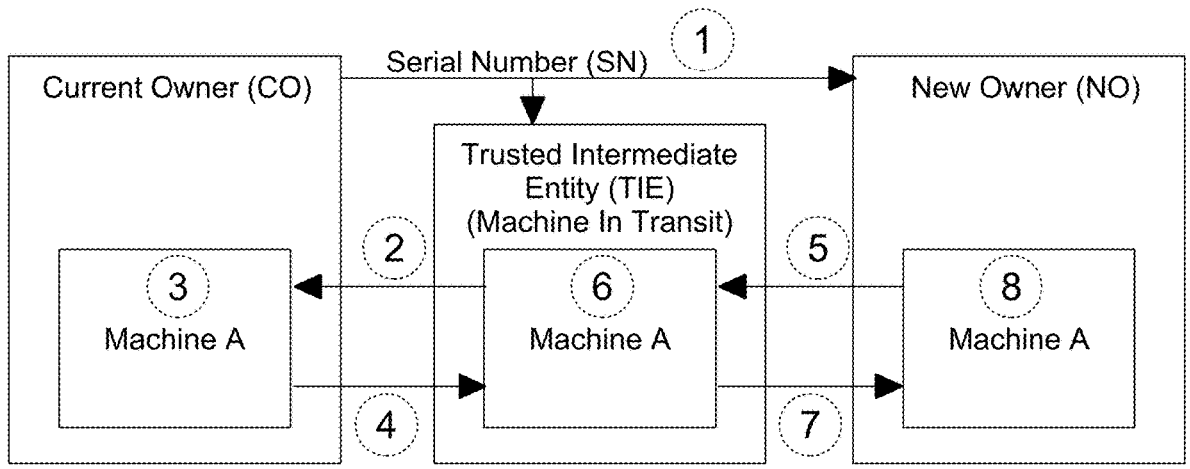

1. CO may send Machine A serial number to TIE and NO (if NO is known)

2. TIE may send OTAKpub1 key to CO

3. CO may run ENABLE_UNRESTRICTED_TRANSFERS command passing OTAKpub1 key as new OTAK public key 4. CO may send Machine A to TIE 5. NO may send OTAKpub2 key to TIE 6. TIE may run UPDATE_OTAK_KEY command passing OTAKpub2 key as new OTAK public key (TIE signs command with OTAKpriv1 key)

7. TIE may send Machine A to NO

8. NO may run UPDATE_CONTAINER_REQUEST with "transfer ownership" sub-command (NO signs command with OTAKpriv2 key)

FIGURE 11

1. CO sends Machine B serial number to NO

2. NO sends OTAKpub3 key to CO

3. CO runs ENABLE_UNRESTRICTED_TRANSFERS command passing OTAKpub3 key as new OTAK public key 4. CO sends Machine B to UIE 5. UIE forwards Machine B to NO (as is)

6. NO runs UPDATE_CONTAINER_REQUEST with "transfer ownership" command (NO signs command with OTAKpriv3 key)

MANAGING OWNERSHIP OF AN ELECTRONIC DEVICE

PRIORITY

The present application claims priority to U.S. Provisional Patent Application No. 63/314,428 filed Feb. 27, 2022, the contents of which are hereby incorporated in their entirety.

FIELD OF THE INVENTION

The present disclosure relates to electronic devices, and more particularly to systems and methods for managing ownership of an electronic device, including secure transfer of ownership of the electronic device, over time.

BACKGROUND

In computing products, the embedded controller (EC) boot code stored in boot ROM may act as the Root of Trust (RoT) for secure boot applications for a particular owner (e.g., original equipment manufacturer (OEM)) of an electronic device. The OEM may store configuration options in a one-time-programmable (OTP) memory during device provisioning. This may include cryptographic keys used for encrypting and signing the boot images. The OEM may implement and sign the EC boot images that are loaded and authenticated by boot code stored in the boot ROM. The boot code may use custom values stored in OTP memory for authenticating and decrypting the boot images. Other features supported by the boot code may include key revocation and rollback protection. This may allow the owner to deactivate one or more of the keys stored in a key manifest on the electronic device or to remove specific image revisions from service, in particular by setting bits in OTP memory during the boot sequence.

ECs with secure boot typically have a single configuration provisioned in OTP memory determined at manufacturing time by the first owner (e.g., OEM). An image authentication key manifest is generated, hashed and stored in a key hash blob (KHB), and the hash of the KHB is stored in OTP memory. As a result, all owners of the device use OEM signed images.

The present disclosure provides systems and method to support multiple owners of a particular electronic device over time, including secure transfer of ownership between different owners.

SUMMARY

According to one example, a system may include an electronic device. The electronic device may have a one-time-programmable (OTP) memory, a boot code, a volatile memory, and a non-volatile memory. The boot code may comprise immutable code stored in a read-only memory, authenticated code stored in the non-volatile memory, or authenticated code stored in the volatile memory. The boot code may be executable by a processor to use information stored in the OTP memory to authenticate code associated with an implicit owner of the electronic device; receive, from the authenticated code associated with the implicit owner of the electronic device, a first create owner container request; in response to the first create owner container request, create a first owner container for a first owner of the electronic device, the first owner container comprising a first signed data image associated with the first owner of the electronic device; store the first owner container in the non-volatile memory; and use the first signed data image associated with the first owner of the electronic device to authenticate first executable code associated with the first owner of the electronic device. The boot code may be executable by the processor to perform a transfer of ownership from the first owner of the electronic device to a second owner of the electronic device, which may include authenticating a signed transfer of ownership command using a key stored in the first owner container; creating a second owner container in response to successful authentication of the signed transfer of ownership command, the second owner container comprising a second signed data image associated with the second owner of the electronic device; storing the second owner container in the non-volatile memory; revoking the first owner container; and using the second signed data image associated with the second owner of the electronic device to authenticate second executable code associated with the second owner of the electronic device.

Another example provides a method for an electronic device having a one-time-programmable (OTP) memory and non-volatile memory. The method may include using information stored in the OTP memory to authenticate code associated with an implicit owner of the electronic device. The method may include receiving, from the authenticated code associated with the implicit owner of the electronic device, a first create owner container request and, in response to the first create owner container request, creating a first owner container, the first owner container comprising a first signed data image associated with the first owner of the electronic device. The method may include storing the first owner container in the non-volatile memory and using the first signed data image associated with the first owner of the electronic device to authenticate first executable code associated with the first owner of the electronic device. The method may include authenticating a signed transfer of ownership command using a key stored in the first owner container and, in response to successful authentication of the signed transfer of ownership command, creating a second owner container for a second owner of the electronic device, the second owner container comprising a second signed data image associated with the second owner of the electronic device. The method may include storing the second owner container in the non-volatile memory, revoking the first owner container, and using the second signed data image associated with the second owner of the electronic device to authenticate second executable code associated with the second owner of the electronic device.

Another example provides a system that may include an electronic device. The electronic device may have a one-time programmable (OTP) memory, the OTP memory including configuration information corresponding to an implicit owner of the electronic device. The electronic device may additionally have an immutable boot code stored in read-only memory and a non-volatile memory. The immutable boot code may be executable by a processor to determine whether a first owner container exists in the non-volatile memory and, in response to determining the first owner container does not exist in the non-volatile memory, prohibit loading executable code that cannot be authenticated using the configuration information corresponding to the implicit owner of the electronic device. The boot code may also authenticate, using the configuration information corresponding to the implicit owner of the electronic device, first executable code associated with the implicit owner of the electronic device. The boot code may also load the authenticated first executable code associated with the implicit owner of the electronic device. The boot code may receive, from the authenticated executable code associated with the implicit owner of the electronic device, a first create owner container request. The boot code may create the first owner container in response to the first create owner container request, the first owner container comprising a first signed data image associated with a first owner of the electronic device. The boot code may store the first owner container in the non-volatile memory and, in response to determining the first owner container exists in the non-volatile memory, prohibit loading executable code that cannot be authenticated using the first signed data image associated with the first owner of the electronic device. The boot code may additionally authenticate, using the first signed data image associated with the first owner of the electronic device, first executable code associated with the first owner of the electronic device, and load the authenticated first executable code associated with the first owner of the electronic device.

BRIEF DESCRIPTION OF THE DRAWINGS

The figures illustrate example methods and systems for managing ownership of an electronic device, including secure transfer of ownership of the electronic device, over time.

FIG. 11 and FIG. 12 illustrate block diagrams of two examples of managing ownership of an electronic device using an unrestricted transfer and an owner transfer authorization key (OTAK).

Figure 1:
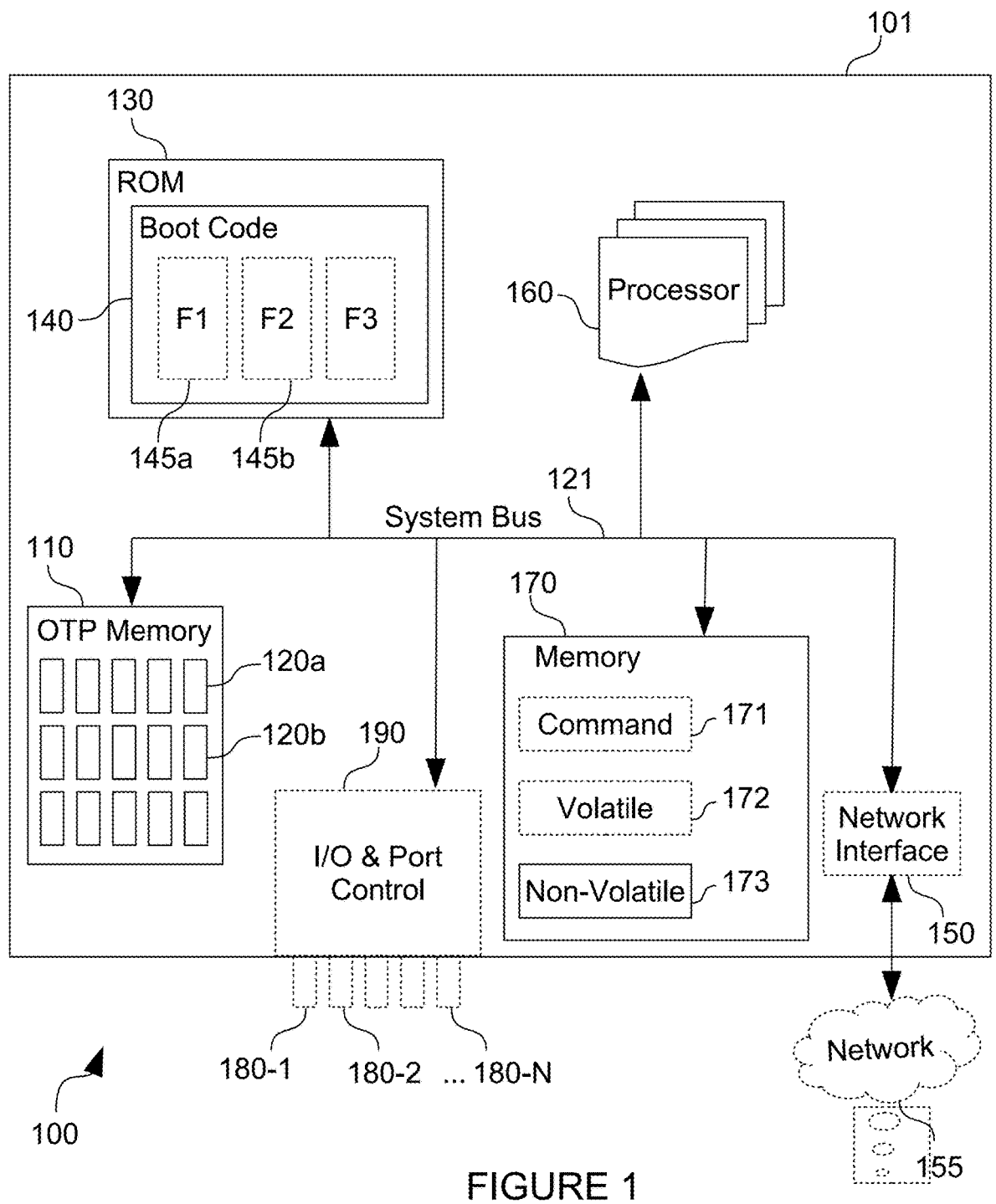
FIG. 1 illustrates a block diagram of an example system for managing ownership of an electronic device, including through secure transfer of ownership of the electronic device, over time.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

The present disclosure provides systems and method to support multiple owners of a particular electronic device over time, including secure transfer of ownership between the different owners, by storing each owner's information and configuration in a signed secure replay protected monotonic counter (RPMC) owner container in memory, e.g., in serial peripheral interface (SPI) flash memory. In an example, the owner's cryptographic keys, secrets, and configuration information may be stored in a secure manner in non-volatile memory (NVM) (e.g., OTP memory, SPI flash memory, or electrically erasable programmable read-only memory (EEPROM)). Because secure information may be stored in an erasable memory, the content may be signed and verified before it is used to aid in security. In some examples the system and methods for storing and updating the secure RPMC owner container may comply with NIST 800-193 Platform Firmware Resiliency Guidelines.

When an electronic device (e.g., a microcontroller) starts up (e.g., power on or after a hardware or software reset), boot code may be loaded and executed by a processor on the device. The boot code may perform functions related to the device start-up, for example, initializing the hardware, which may include disabling interrupts, initializing buses, setting processor(s) in a specific state, and initializing memory. After performing the hardware initialization, the boot code may then load first mutable code (FMC), for example, from a signed first mutable binary (FMB) that may comprise one or more images. In an example, FMC may be application firmware that may be signed by an OEM or other owner of the electronic device. In the same or different examples, the FMC may be the OEM or other owner application firmware, ROM extension (ROM_EXT) or boot code extension, RIoT Code, or other mutable code. The functions performed by the boot code may be called the boot process.

The electronic device may contain security mechanisms to protect against malicious attacks on the device. For example, an electronic device may prevent (1) the loading and execution of FMC, (2) transfer of ownership of the electronic device, or (3) crisis recovery by anyone other than the silicon owner. In an example, these operations may require knowledge of secrets (e.g., cryptographic keys) known to the silicon owner. Because the silicon owner controls the secrets (e.g., cryptographic keys) used for the loading and execution of FMC, transfer of ownership, and crisis recovery, malicious attacks on the device may be reduced.

The silicon owner, or owner of the electronic device, may be the entity that provides the signed FMB that is loaded and authenticated by the boot code. The FMB may contain the FMC image loaded and executed by the boot code. The owner may provide a KHB that may contain hashes of each of the public keys that may be used to authenticate the FMB. For example, during manufacturing, a hash of the OEM KHB may be stored in OTP memory and the OEM KHB itself may be stored in non-volatile memory (e.g., SPI flash). The boot code may compute the SHA384(OEM KHB) and compare it against the hash of the OEM KHB stored in OTP memory. If the computed hash matches the stored hash, boot code may trust the public key hashes stored in the OEM KHB and use those to authenticate the OEM FMB. The OEM may establish ownership during manufacturing (e.g., the OEM as an implicit owner) or when ownership is requested by another entity. Once ownership is established, the silicon owner may choose to use the OEM images signed by OEM image signing keys or the owner may provide its own images signed by its image signing keys. In the latter example, an owner-provided KHB hash value may be stored in a secure RPMC owner container and an owner-provided KHB may be stored in non-volatile memory (e.g., SPI flash). The owner's image signing keys may be validated by the hashes stored in the owner-provided KHB. For example, the boot code may compute the SHA384 (owner-provided KHB) and compare it against the stored owner-provided KHB hash value. If the computed hash matches the stored hash, boot code may trust the public key hashes stored in the owner-provided KHB and use those to authenticate the owner-provided FMB.

Security features for an electronic device may be implemented using the boot code on the electronic device. In an example, the security features may be implemented using immutable boot code. Immutable boot code, which may be referred to as a hardware Root of Trust (RoT), may be built into the electronic device during fabrication and, therefore, may be implicitly trusted because it cannot be modified.

For the purposes of this disclosure, an electronic device may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an electronic device may be a personal computer, a PDA, a consumer electronic device, a server, a network storage device, or any other suitable device and may vary in size, shape, performance, functionality, and price. The electronic device may include memory, one or more processing resources such as a central processing unit (CPU) or hardware or software control logic. Additional components of the electronic device may include one or more storage devices, one or more communications ports for communicating with external devices as well as various input and output (I/O) devices, such as a keyboard, a mouse, and a video display. The electronic device may also include one or more buses operable to transmit communication between the various hardware components.

System

FIG. 1 illustrates a block diagram of an example system 100 for managing ownership of an electronic device 101, including through secure transfer of ownership of the electronic device, over time. As depicted in FIG. 1, system 100 may comprise electronic device 101. Components of electronic device 101 may include, without limitation, one or more processors 160 and a system bus 121 that communicatively couples various system components to processors 160 including, for example, OTP memory 110, ROM 130, memory 170, I/O & port control 190, and a network interface 150. The system bus 121 may be any suitable type of bus structure, e.g., a memory bus, a peripheral bus, or a local bus using any of a variety of bus architectures.

Processor 160 may comprise any system, device, or apparatus operable to interpret or execute program instructions or process data, and may include, without limitation a microprocessor, microcontroller, digital signal processor (DSP), application specific integrated circuit (ASIC), or any other digital or analog circuitry to interpret or execute program instructions or process data. In some examples, processor 160 may interpret or execute program instructions or process data stored locally (e.g., in memory 170, ROM 130, OTP memory 110, or another component of electronic device 101). In the same or alternative examples, processor 160 may interpret or execute program instructions or process data stored remotely.

OTP memory 110 (one-time-programmable memory) may comprise any system, device, or apparatus that can be programmed only once and thereafter retain the programmed data. OTP memory 110 may comprise one-time-programmable bits 120a, 120b, and others. In an example, bits 120a and 120b of OTP memory 110 may comprise traditional logic gates connected with metal wiring and the connections may be paired with fuses. During programming, the fuses may be blown out in order to make these connections permanent. In this manner, OTP memory 110 may be unmodifiable once programmed. In an example, an unprogrammed bit (e.g., 120a, 120b) may return a value of 0 when read by processor 160 whereas a programmed bit may return a value of 1 when read by processor 160. According to this example, once the bit 120a, 120b has been programmed with a 1 value, it cannot be re-programmed to a 0 value.

ROM 130 may comprise any system, device, or apparatus operable to retain program instructions or data after power to electronic device 101 is turned off (e.g., a non-volatile memory). ROM 130 (e.g., boot ROM) may comprise boot code 140, which may be used by processor 160 during the boot process (or start-up) of electronic device 101. According to an example, boot code 140 may be immutable, i.e., built into the electronic device during fabrication and, therefore, may be implicitly trusted (e.g., a hardware root of trust) because it cannot be modified. Boot code 140 may comprise code that performs functions including, without limitation, functions F1 (145a) and F2 (145b), among others. In an example, boot code 140 may be authenticated mutable code that may act as a ROM extension (e.g., FMC that may be authenticated by other boot code stored in ROM, where FMC may be stored in volatile memory 172 or non-volatile memory 173).

Memory 170 may comprise any system, device, or apparatus operable to retain program instructions or data for a period of time. Memory 170 may comprise random access memory (RAM, SRAM, DRAM), EEPROM, a PCMCIA card, flash memory (e.g., SPI flash), magnetic storage, opto-magnetic storage, hardware registers, or any suitable selection or array of volatile or non-volatile memory. In the illustrated example, memory 170 includes, without limitation, command memory 171, volatile memory 172, and non-volatile memory 173.

I/O & port control 190 may comprise any system, device, or apparatus generally operable to receive or transmit data to/from/within electronic device 101. I/O & port control 190 may comprise, for example, any number of communication interfaces, graphics interfaces, video interfaces, user input interfaces, or peripheral interfaces (e.g., without limitation, JTAG, I2C, UART, Test Access Port). I/O & port control 190 may be communicatively coupled to external ports/pins 180-1, 180-2, . . . 180-N (and others not depicted).

Network interface 150 may be any suitable system, apparatus, or device operable to serve as an interface between electronic device 101 and a network 155. Network interface 150 may enable electronic device 101 to communicate over network 155 using any suitable transmission protocol or standard. Network 155 and its various components may be implemented using hardware, software, or any combination thereof.

Although FIG. 1 illustrates various components of electronic device 101, other example systems may include electronic devices with more or fewer components. In an example, an electronic device 101 according to this disclosure may not include one or all of the components drawn in dashed lines without departing from the spirit and scope of these disclosed examples. Additionally, the various components of electronic device 101 may reside on the same die (e.g., a primary die) or may reside on separate dies. In an example, various components may reside inside the package in a multi-chip module (MCM) or externally on a system board. In the same or different examples, various components of electronic device 101 may reside in one or more of the primary die, in an MCM, and externally on a system board.

OTP Memory

Figure 2:
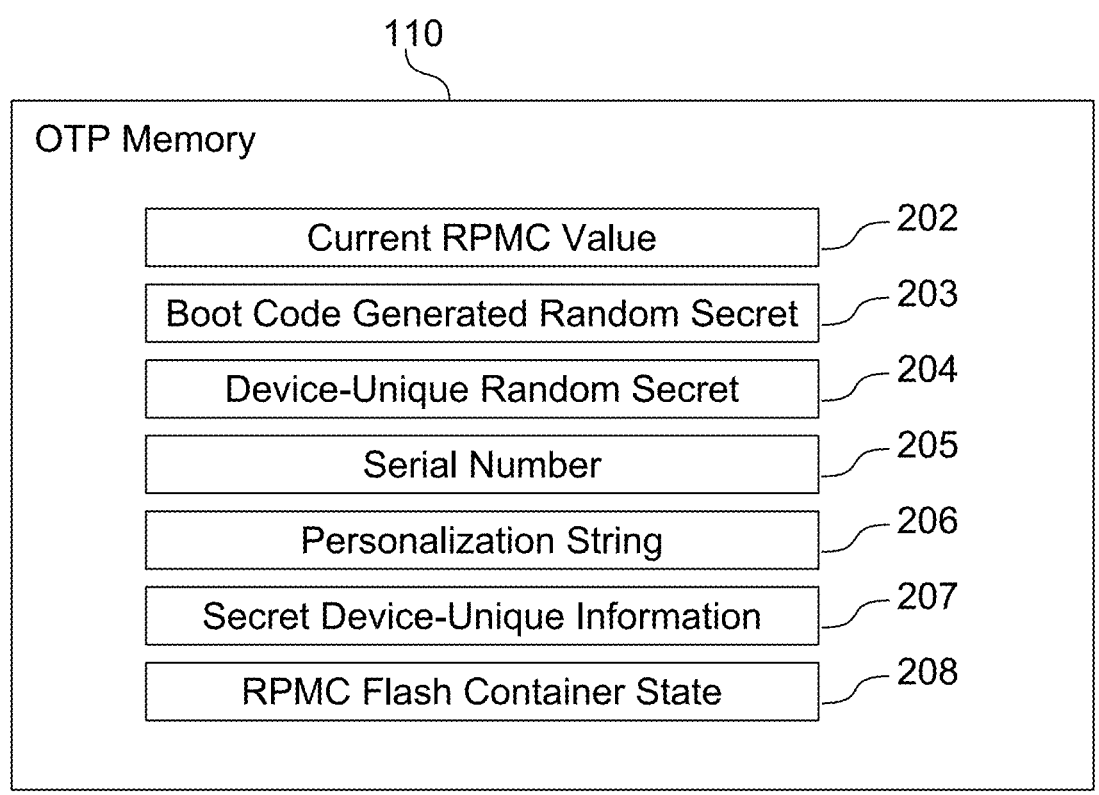
FIG. 2 illustrates a block diagram of an example OTP memory for managing ownership of an electronic device, including through secure transfer of ownership of the electronic device, over time.

FIG. 2 illustrates a block diagram of an example OTP memory 110 for managing ownership of an electronic device 101, including through secure transfer of ownership of the electronic device, over time. As depicted in FIG. 2, OTP memory 110 may include regions, including current RPMC value 202, boot code generated random secret 203, device-unique random secret 204, serial number 205, personalization string 206, secret device-unique information 207, and RPMC flash container state 208.

Current RPMC value 202 may be a replay protected monotonic counter that is incremented over time. In the example shown in TABLE 1, current RPMC value 202 may be an 8-bit region in OTP memory 110 and may correspond to nine different values (0-8). In this example, bits in OTP memory 110 for current RPMC value 202 may be set sequentially from lowest bit ([0]) to highest bit ([8]), and the next RPMC value may be the next integer value after current RPMC value 202. In the same or different examples, values less than current RPMC value 202 may be considered revoked and values greater than current RPMC value 202 may be considered unused. In the example shown in TABLE 1, values greater than 8 may not be used. In other examples where more than eight bits in OTP memory 110 are allocated to the current RPMC value 202, values greater than 8 may be possible. A value less than current RPMC value 202 may be considered revoked because OTP memory 110 may not be programmed to a lesser value because OTP memory, by definition, may be programmed only once. For example, when current RPMC value 202 has a value of one (1), the least significant bit is programmed and cannot be unprogrammed to reset the current RPMC value 202 back to a value of zero (0).

TABLE 1

| OTP [7:0] (binary format) | Current RPMC Value (hex format) | Next RPMC Value (hex format) | Revoked RPMC Values (hex format) | Unused RPMC Values (hex format) |
|---|---|---|---|---|
| 0000_0000 | 0 | 1 | None | 1-8 |
| 0000_0001 | 1 | 2 | 0 | 2-8 |
| 0000_001x | 2 | 3 | 0-1 | 3-8 |
| 0000_01xx | 3 | 4 | 0-2 | 4-8 |
| . . . | . . . | . . . | . . . | . . . |
| 01xx_xxxx | 7 | 8 | 0-6 | 8 |
| 1xxx_xxxx | 8 | n/a | 0-7 | None |

Boot code generated random secret 203 may be any random information generated by and accessible only to boot code 140. For example, boot code generated random secret 203 may be a random number generated by boot code 140 after provisioning of electronic device 101 is complete. Device-unique random secret 204 may be any random information that is unique to electronic device 101. In an example, device-unique random secret 204 may be a device-unique random number programmed into OTP memory 110 during provisioning (e.g., by the tester). In another example, device-unique random secret 204 may be a random number generated by boot code 140 after provisioning of electronic device 101 is complete. Serial number 205 is a unique serial number assigned to electronic device 101 and programmed into OTP memory 110 during provisioning (e.g., by the tester). Personalization string 206 may be a known string programmed into OTP memory 110 during provisioning (e.g., by the tester). In alternative examples, personalization string 206 may be hard-coded in boot code 140 instead of being stored in OTP memory 110.

Secret device-unique information 207 may include (a) a device identity key ("DevIK") (e.g., a private key of a public-key cryptography key pair) or information from which a DevIK can be generated, (b) critical device configuration, e.g., image authenticity and key authenticity, (c) other cryptographic keys used by electronic device 101, or (d) other device-unique information. In some examples, secret device-unique information 207 may include (a) a unique device secret (UDS) or an encrypted UDS, or (b) a ROM seed (e.g., a random number generated by boot code 140), wherein boot code 140 may use such UDS and ROM seed as source data to generate a DevIK or other device-unique information.

RPMC flash container state 208 may indicate whether the RPMC owner feature is enabled. In an example, RPMC owner feature may be disabled by default at the time of manufacture, and this disabled state may be reflected in the RPMC flash container state 208. Boot code 140 may program RPMC flash container state 208 to indicate the owner feature is enabled when a first owner container is created.

Although FIG. 2 illustrates various regions of OTP memory 110, other example systems may include electronic devices with more or fewer regions.

RPMC Owner Container

Figure 3:
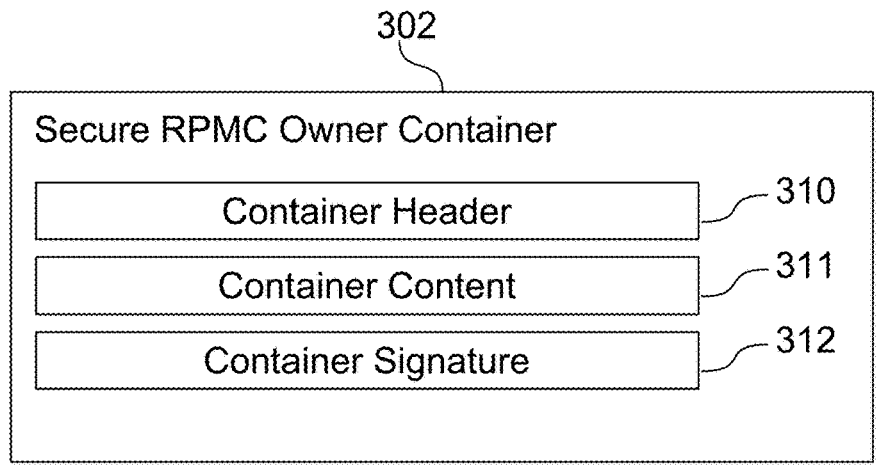
FIG. 3 illustrates a block diagram of an example secure RPMC owner container for managing ownership of an electronic device, including through secure transfer of ownership of the electronic device, over time.

FIG. 3 illustrates a block diagram of an example secure RPMC owner container 302 (owner container 302) for managing ownership of an electronic device 101, including through secure transfer of ownership of the electronic device, over time. In an example, an owner container 302 may be a signed data image stored in non-volatile memory (e.g., OTP memory 110, non-volatile memory 173, among others) that may contain the current silicon owner's configuration information and secrets to enable boot code 140 to load and execute the owner's executable images (e.g., FMC in FMB). As depicted in FIG. 3, owner container 302 may include three regions: container header 310, container content 311, and container signature 312. In an example, owner container 302 may be a unique signed container of information modified, stored in, and retrieved from OTP memory (e.g., OTP memory 110) or other non-volatile memory (e.g., non-volatile memory 173) by the code that creates the container (e.g., boot code 140 or a ROM extension (e.g., in authenticated FMC)). According to examples in this disclosure, owner container 302 may be signed and updated only by the code that created the container. Higher-level firmware (e.g., code other than the code that created the container) may require a command interface (e.g., command memory 171, FIG. 7) to access or modify information in owner container 302. In an example, only immutable boot code (e.g., boot code 140) may access or modify information in owner container 302. In an example, boot code that creates owner container 302 may create two redundant copies of owner container 302. One copy may be the primary owner container and the other copy may be the fallback owner container.

Container Signature

Container signature 312 may comprise a signature corresponding to owner container 302 and may be generated by boot code 140. In an example, boot code 140 may use a physically unclonable function (PUF) or a deterministic random bit generator (DRBG) to generate ECDSA signing keys. ECDSA signing keys may be generated by any signing algorithm. For example, container signature 312 may be a ECDSA-384 signature having the following characteristics:

Algorithm: Elliptic Curve Digital Signature Algorithm (ECDSA)
Key Size: 384 bit
Curve: NIST "secp384r1" curve
Hashing Algorithm: SHA384
Signed Message (m)={container header 310|container content 311}

Boot code 140 may derive the ECDSA private signing key used to sign owner container 302. In an example, the signing key may be generated as a function of the current owner and the unique silicon die. Thus, it may be possible to have a unique signing per owner per silicon die. According to an example, boot code 140 may use a DRBG to derive the ECDSA private signing key and may provide the following inputs to the DRBG:

Personalization String: may be a known string, e.g., "Container *one* Key Generator"
Additional Input: may be {RPMC value 431|device serial number 435}
Entropy Input: may be device unique random secret 204
True Random Number Generator (TRNG) Input: may be boot code generated random secret 203

In the above example, boot code 140 may generate the ECDSA private signing key using a method from section B.4.1 Key Pair Generation Using Extra Random Bits of the FIPS 186-4 specification:

private key (d)
d=(c mod (n−1))+1
n=prime number defined for P-384 curve
c=448-bit random positive integer value In an example, boot code 140 may extract the first 448-bit positive integer value generated by the DRBG and use that value for "c" to generate the ECDSA private signing key.

Although FIG. 3 illustrates various regions of owner container 302, other example systems may include electronic devices with more or fewer regions.

Container Header

Figure 4:
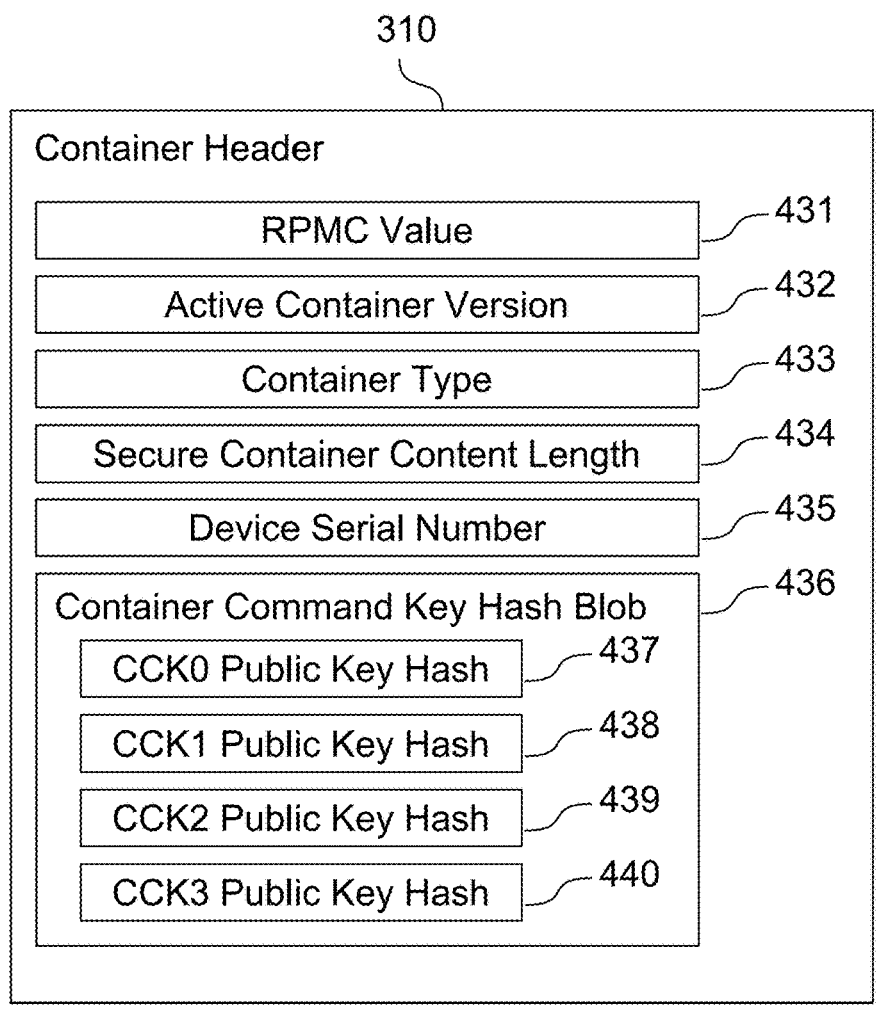
FIG. 4 illustrates a block diagram of an example container header of an owner container for managing ownership of an electronic device.

FIG. 4 illustrates a block diagram of an example container header 310 of an owner container 302 for managing ownership of an electronic device 101. In an example, container header 310 may have a common format for the owner containers created for electronic device 101. As depicted in FIG. 4, container header 310 may include regions 431-436, including: RPMC value 431, active container version 432, container type 433, secure container content length 434, device serial number 435, and container command key hash blob 436.

RPMC value 431 may be a replay protected monotonic counter that may be checked against the current RPMC value 202 in OTP memory 110 to determine if this owner container is valid or has been revoked. In an example, when RPMC value 431 for an owner container 302 has a value of three (3), boot code 140 may determine that owner container is valid when the current RPMC value 202 also has a value of three (3) (e.g., FIG. 2). In the same or different examples, when RPMC value 431 for an owner container 302 has a value of three (3), boot code 140 may determine that owner container is revoked when the current RPMC value 202 has a value greater than three (3) (e.g., FIG. 2 (Revoked RPMC Values)). In some examples, RPMC value 431 may be used in the check for primary and fallback containers.

Active container version 432 may represent a version number for owner container 302. In an example, the owner of electronic device 101 may desire to update information in owner container 302 (e.g., regions illustrated in FIG. 6) in a way that does not require incrementing the RPMC value 431. Accordingly, boot code 140 may increment active container version 432 when the other information is updated. In another example, boot code 140 may set active container version 432 to zero (0) during operations where RPMC value 431 is incremented. Thus, the container with the highest RPMC value 431 and highest active container version 432 may be the primary owner container for electronic device 101.

Container type 433 may represent a type associated with owner container 302. In an example, container type 433 may have a value indicating the container is uninitialized. In another example, container type 433 may have a value indicating owner container 302 is initialized and is a valid owner container. Secure container content length 434 may indicate the number of bytes in owner container content 311. Device serial number 435 may correspond to the serial number of electronic device 101, e.g., unique serial number 205 in OTP memory 110. Container command key hash blob 436 may contain a hash (e.g., SHA384 (Secure Hash Algorithm)) of one or more container command keys (CCK) which may be public keys of a cryptographic key pair. In the illustrated example, container command key hash blob 436 may include hashes of CCK0 437, CCK1 438, CCK2 439, and CCK3 440. In an example, these key hashes may be used to verify commands related to owner container 302. (Alternatively, container command key hash blob 436 may contain the public keys instead of hashes of the public keys. In this example, more memory may be needed.) In an example, CCK0-3 (437-440) may be revoked by setting the hash entry to zero (0). Although FIG. 4 illustrates various regions of container header 310, other example systems may include electronic devices with more or fewer regions.

Container Contents

Figure 5:
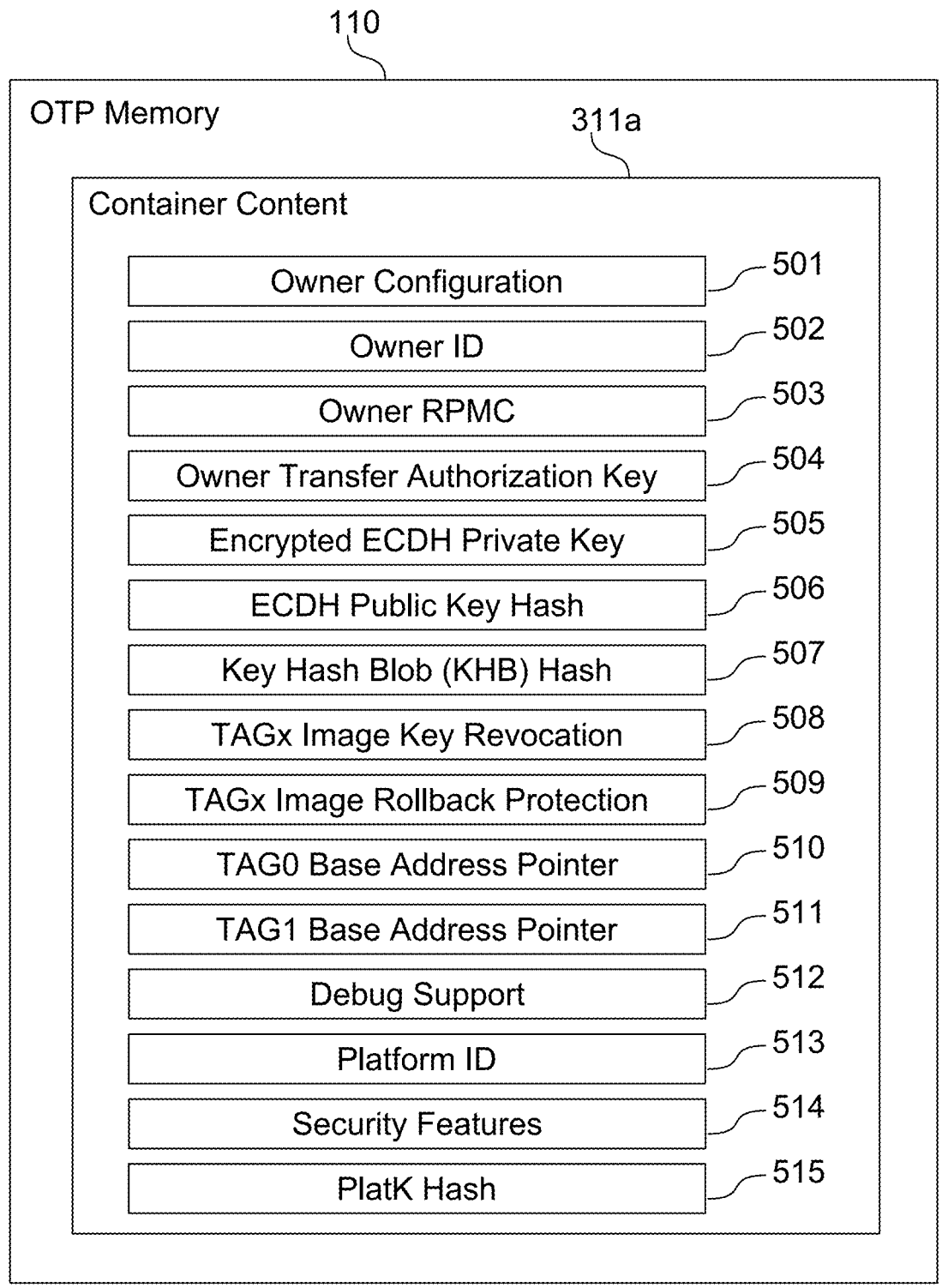
FIG. 5 illustrates a block diagram of example container content of an owner container for managing ownership of an electronic device.

Owner container 302 may have different configurations that may be based on the configuration source, including:

FMB Image Configuration Source=OTP memory (e.g., FIG. 5)

Figure 6:
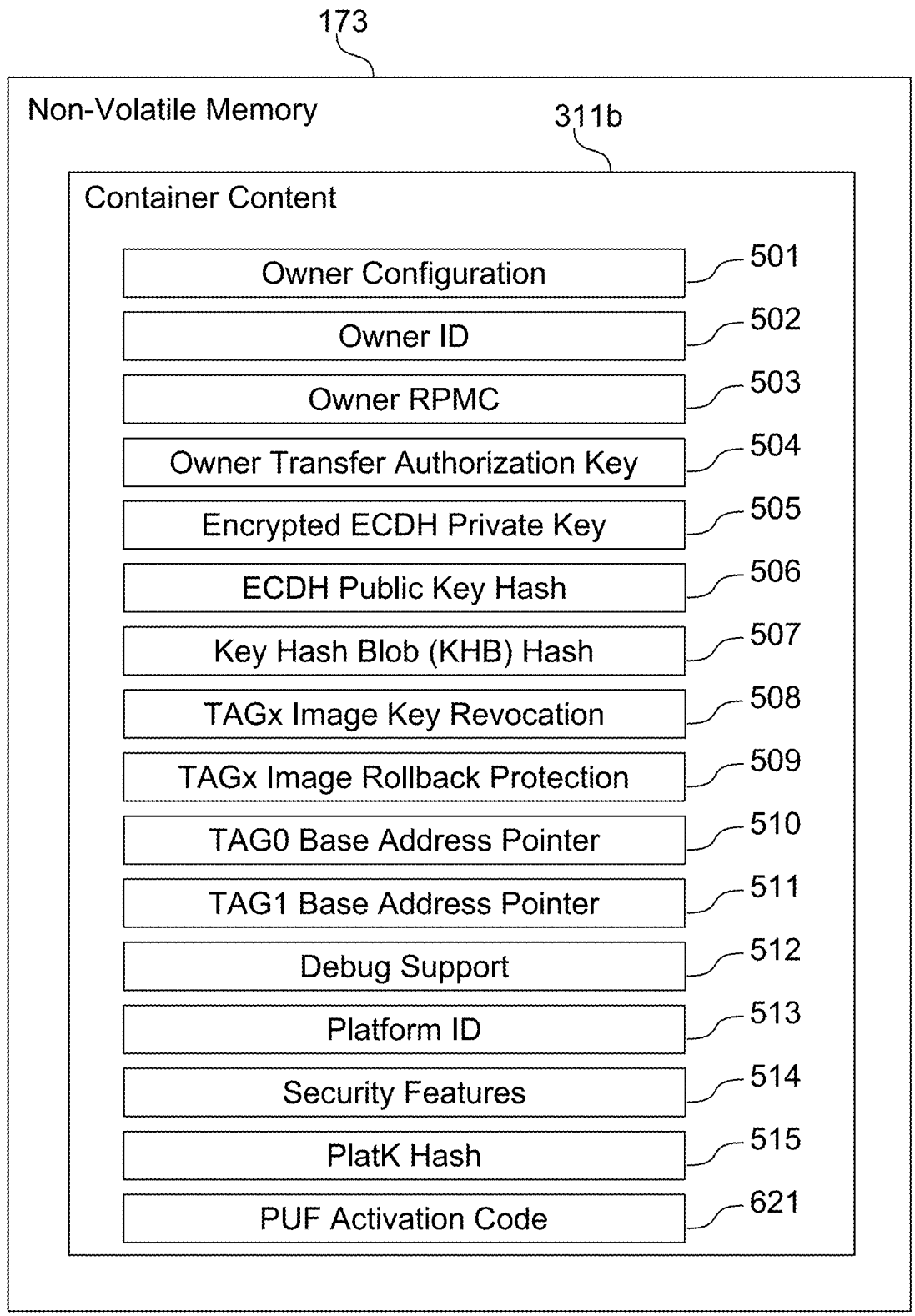
FIG. 6 illustrates a block diagram of example container content of an owner container for managing ownership of an electronic device.

FMB Image Configuration Source=OTP emulation in SPI flash RPMC container (e.g., FIG. 6)

FIG. 5 illustrates a block diagram of example container content 311a of an owner container 302 for managing ownership of an electronic device 101. As depicted in FIG. 5, container content 311a may be programmed in OTP memory 110 and may include regions 501-515, including: owner configuration 501, owner ID 502, owner RPMC 503, owner transfer authorization key (OTAK) 504, encrypted ECDH private key 505, ECDH public key hash 506, key hash blob (KHB) hash 507, TAGx image key revocation 508, TAGx image rollback protection 509, TAG0 base address pointer 510, TAG1 base address pointer 511, debug support 512, platform ID 513, security features 514, and PlatK hash 515. In an example, some or all of container content 311a may be programmed into OTP memory 110 during provisioning (e.g., by the tester). In the same or different example, some or all of container content 311a may be programmed into OTP memory 110 by boot code 140 after provisioning of electronic device 101 is complete. Higher-level firmware (e.g., code other than the code that created the container) may require a command interface (e.g., command memory 171, FIG. 7) to access or modify information in container content 311a of owner container 302.

Owner configuration 501 may include the location of configuration information corresponding to the FMB. For example, configuration information may be located in OTP memory 110, non-volatile memory 173, or other memory. In an example, when configuration information is located in OTP memory 110, the container configuration may be an OTP configuration. In an example, when configuration information is located in non-volatile memory 173 (e.g., SPI flash), the container configuration may be emulating OTP memory (OTP emulation configuration).

Owner configuration 501 may include information on who can transfer ownership of electronic device 101. In an example, the current silicon owner may transfer ownership by executing a transfer of ownership command signed by the owner's public container command key (CCK). In another example, both the current silicon owner and the new owner may transfer ownership. The current silicon owner may transfer ownership by executing a transfer of ownership command signed by the owner's public CCK, and the new owner may transfer ownership by executing a transfer of ownership command signed by an owner transfer authorization key (OTAK). The OTAK may be a public key programmed by the current owner into owner container 302 (e.g., in owner transfer authorization key 504) that may enable the new owner (or approved intermediate entity) to execute a transfer of ownership command. Owner configuration 501 may include information indicating whether RPMC owner container crisis commands are supported. In an example, if crisis commands are enabled, an owner may use I/O & port control 190 (e.g., I2C crisis port, UART crisis port) to insert owner container commands into command memory 171 (e.g., FIG. 7). In an example, owner container crisis commands may be disabled by default and may be enabled (e.g., by programming owner configuration 501) by an owner of electronic device 101.

Owner ID 502 may be a value provided by the owner at the time of ownership transfer and may be used to identify the owner. Owner RPMC 503 may be a value determined by boot code 140 at the time of ownership transfer. For example, it may be the first RPMC value assigned to the owner at the time ownership transfer. In an example, owner ID 502 and owner RPMC 503, together, may indicate a unique owner for a particular electronic device 101. Owner transfer authorization key (OTAK) 504 may be a one-time ECDSA-384 public key (Elliptic Curve Digital Signature Algorithm) used to verify a transfer of ownership command, for example, when configuration information in owner configuration 501 enables a new owner to execute a transfer of ownership command.

Encrypted ECDH private key 505 may be an encrypted ECDH (Elliptic-curve Diffie-Hellman) private key used to derive an AES256 (Advanced Encryption Standard) image encryption key (IEK) that may be used to decrypt a FMB image stored in non-volatile memory 173. ECDH public key hash 506 may be a SHA384 hash of an ECDH public key that may be used to derive an AES256 key encryption key (KEK) that may be used to decrypt encrypted ECDH private key 505. In an example, encrypted ECDH private key 505 and ECDH public key hash 506 may be exchanged according to a Diffie-Hellman key exchange protocol and used to decrypt a FMB image.

Key hash blob (KHB) hash 507 may be a SHA384 hash of an owner provided KHB (e.g., stored in non-volatile memory 173) that may contain hashes of each of the public keys that may be used to authenticate other data (e.g., the FMB, RPMC container commands, among others). TAGx image key revocation 508 may indicate whether public keys in the owner's KHB are available or have been revoked (not available for use). In an example, KHB may include eight (8) public keys and TAGx image key revocation 508 may comprise one bit corresponding to each public key. In this example, when a bit in TAGx image key revocation 508 is programmed to a value of one (1), the corresponding key may be revoked. In an example, boot code 140 may not use a revoked key (e.g., before using a key, boot code 140 may check to ensure a corresponding bit in TAGx image key revocation 508 is not programmed to a value of one (1)). TAGx image rollback protection 509 may indicate whether a current image revision (e.g., FMB) is available for use or has been revoked (not available for use). In an example, KHB may allow for up to 128 image revisions and TAGx image rollback protection 509 may comprise one bit corresponding to each revision. In this example, when a bit in TAGx image rollback protection 509 is programmed to a value of one (1), the corresponding image revision may be revoked. In an example, boot code 140 may not authenticate a revoked image (e.g., before loading an image, boot code 140 may check to ensure a corresponding bit in TAGx image rollback protection 509 is not programmed to a value of one (1)).

TAG0 base address pointer 510 may be the base address for the image header of the FMB. TAG1 base address pointer 511 may be the base address for the image header of the copy of the FMB. Debug support 512 may indicate whether debug (e.g., UART production debug) is supported. Platform ID 513 may comprise an owner platform identification value. Security features 514 may indicate whether the current owner has enabled various security features. In an example, security features 514 may indicate whether an image rollback protection feature is enabled (e.g., whether an image revision may be revoked using TAGx image rollback protection 509). In the same or different examples, security features 514 may indicate whether a key revocation feature is enabled (e.g., whether a key may be revoked using TAGx image key revocation 508). PlatK Hash 515 may comprise a hash (e.g., SHA384) of a platform public key which may be a key used for signing crisis commands (e.g., if owner configuration 501 indicates RPMC owner container crisis commands are supported).

Although FIG. 5 illustrates various regions of container content 311*a*, other example systems may include electronic devices with more or fewer regions. In additional examples, specific regions of container content 311*a* may include features in addition to those described above or may omit some of the features described above.

FIG. 6 illustrates a block diagram of example container content 311*b* of an owner container 302 for managing ownership of an electronic device 101. As depicted in FIG. 6, container content 311*b* may be programmed in non-volatile memory 173 and may include regions 501-515, which are described with respect to FIG. 5 and differ in that they are stored in non-volatile memory 173 rather than OTP memory 110. In an example, an owner container 302 with container content 311*b* stored in non-volatile memory 173 may emulate an owner container stored in OTP memory 110 (OTP emulation) because boot code 140 may store configuration parameters (e.g., in container content 311*b*) when it creates the owner container, and no commands exist for boot code 140 (or other code) to modify those parameters. In the case where a malicious user may attempt to alter the signed owner container while it is stored in non-volatile memory 173 (e.g., to alter any of the OTP emulated parameters), verification of the container will fail. Thus, configuration parameters in owner container 302 stored in non-volatile memory 173 may be considered to emulate OTP memory.

In an example, container content 311*b* may include PUF activation code 621 (e.g., PUF may be based on physical unclonable functions). Boot code 140 may use PUF activation code 621 for generating and passing device attestation key(s) (DevAK) to the silicon owner's firmware. In an example, on the first power on reset cycle after owner container 311*b* is created or updated, boot code 140 may use the shared PUF SRAM to generate PUF activation code 621 and store it in owner container 311*b*. During a subsequent boot process, if boot code 140 loads an authentic image (e.g., FMB), boot code 140 may use PUF activation code 621 to generate DevAK private and public keys. In an example, boot code 140 may place the DevAK public key into an X.509 certificate and sign the certificate using the DevIK private key (e.g., secret device-unique information 207 in FIG. 2). In examples, the signed certificate, along with PUF activation code 621 may be passed to the owner's firmware (e.g., via firmware mailbox 788 in FIG. 7). The owner's firmware may regenerate the DevAK private key using the PUF activation code 621.

In some examples (not illustrated), boot code 140 may generate PUF activation code 621 during manufacturing (e.g., before creating owner container 311*b*). According to this example, boot code 140 may store PUF activation code 621 in non-volatile memory (e.g., non-volatile memory 173) at an address stored in OTP memory 110. Boot code 140 may store a hash of PUF activation code 621 in OTP memory that may be used to verify the integrity of activation code 621 when it is retrieved from non-volatile memory. Accordingly, boot code 140 may use PUF activation code 621 to generate DevAK private and public keys even before creating the first owner container 311*b*.

Although FIG. 6 illustrates various regions of container content 311*b*, other example systems may include electronic devices with more or fewer regions. In additional examples, specific regions of container content 311*b* may include features in addition to those described above or may omit some of the features described above.

Command Interface

Figure 7:
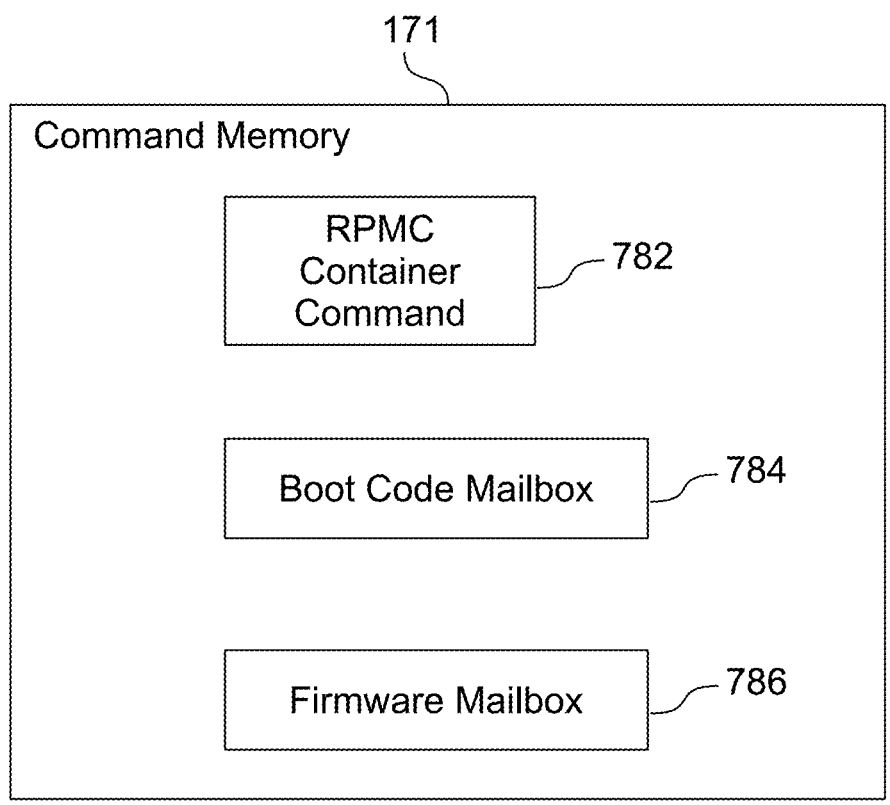
FIG. 7 illustrates an example command memory.

FIG. 7 illustrates an example command memory 171. Command memory 171 may comprise rewritable memory (e.g., registers, SRAM) and may contain RPMC container command 782, boot code mailbox 784, and firmware mailbox 786. According to an example, the boot code 140 may authenticate and optionally decrypt the FMB from non-volatile memory 173 (e.g., SPI flash) and then may load the FMC into internal volatile memory 172 (e.g., SRAM) for subsequent execution by processor 160. For example, the boot code may load the FMB into internal volatile memory 172 (e.g., SRAM), authenticate the FMB, and optionally decrypt the FMB, which may include one or more images, including the FMC as the first image. In an example, the authenticated and optionally decrypted FMB remain in volatile memory 172 (e.g., SRAM). This binary image may be referred to as the "owner" image. The boot code may then cause execution of the FMC by processor 160 (e.g., jumping to the base address of the FMC). The FMC may either be a ROM extension (e.g., an authenticated ROM extension in FMC) or application firmware. An owner application may communicate with boot code 140 or ROM_EXT to request a transfer of ownership or perform some other action on its behalf. The application may communicate this action by loading a signed command into the boot code mailbox 784, setting the associated command bits in RPMC container command 782, and triggering a reset (e.g., soft reset).

In the above example, RPMC container command 782 and boot code mailbox 784 may be used to initiate RPMC container requests to be processed by boot code 140. (Firmware mailbox 786 may be used by boot code 140 (or ROM_EXT) to pass information to application firmware.) In an example, command memory 171 may be user-accessible so that code other than boot code 140 (e.g., FMC) may initiate requests to be processed by boot code 140. In another example, command memory 171 may be accessed via external hardware (UART interface, I2C interface, among others), for example, to perform crisis recovery (if owner configuration 501 in owner container 311*a/b* indicates RPMC owner container crisis commands are supported).

In an example, RPMC container command 782 may include a bit that, when set, may indicate an RPMC command is pending for electronic device 101. RPMC container command 782 may additionally comprise a command field that may indicate a specific command for boot code 140 to process. In the same or another example, boot code mailbox 784 may be programmed with command parameters corresponding to a pending command. In an example, command parameters stored in boot code mailbox 784 may be signed and boot code 140 may authenticate a pending command (e.g., a command may be considered a signed command when the parameters stored in boot code mailbox 784 are signed) during the boot process before executing the command.

Owner Container Actions

The following non-exclusive list of operations may be performed for owner container 302:
CREATE_CONTAINER_REQUEST
INCREMENT_RPMC_REQUEST
UPDATE_CONTAINER_REQUEST
REPAIR_FALLBACK_CONTAINER_REQUEST
CRISIS_RECOVERY_REQUEST
ENABLE_UNRESTRICTED_TRANSFERS
UPDATE_OTAK_KEY In an example, boot code 140 may authenticate a signed command received from trusted application firmware and load it into internal volatile memory 172 (e.g., SRAM) for execution by processor 160. In another example, boot code 140 may authenticate a signed command received as crisis recovery commands from I/O & port control 190 (e.g., I2C, UART) and load it into internal volatile memory 172 (e.g., SRAM) for execution by processor 160.

CREATE_CONTAINER_REQUEST Command

This signed command may be invoked to cause boot code 140 to create and program the first signed owner container 302 in non-volatile memory 173 (e.g., SPI flash). Boot code 140 may ignore this command if it is invoked after the first signed owner container 302 has already been created. For example, after creating the first signed owner container 302, boot code 140 may program a bit in OTP memory 110 (e.g., RPMC flash container state 208) indicating a container was created and thereafter check that OTP bit before executing the CREATE_CONTAINER_REQUEST command. If the OTP bit is programmed, boot code 140 may ignore subsequent CREATE_CONTAINER_REQUEST commands.

In an example, the CREATE_CONTAINER_REQUEST command may result in the creation of two identical signed owner containers 302 (e.g., a primary container and a fallback container). These signed containers may be stored in non-volatile memory 173 (e.g., SPI flash). In an example, boot code will set the OTP bit indicating a container was created if it verifies both signed containers are saved successfully in non-volatile memory 173.

In an example, boot code 140 may use command parameters stored in boot code mailbox 784 for the CREATE_CONTAINER_REQUEST command. Command parameters may include an owner creation public key (OCKpub), a command signature signed with the owner creation private key (OCKpriv), and other command parameters corresponding to regions 433-434 and 437-440 in FIG. 4 (container header 310) and 501-502 and 505-515 in FIG. 6 (container content 311b). Before creating signed owner container 302, boot code 140 may verify the command signature using OCKpub. In an example, boot code 140 may verify command parameter OCKpub by computing its hash and comparing that to the OCKpub hash retrieved from the KHB stored in non-volatile memory 173. (The KHB stored in non-volatile memory 173 may be validated against KHB hash 507 in OTP memory 110.) If verification of either OCKpub or the command signature fails, boot code 140 may stop execution of the CREATE_CONTAINER_REQUEST command without creating the first owner container 302. In an example, boot code 140 may store an unsuccessful command status in firmware mailbox 786.

If verification is successful, boot code 104 may create signed owner container 302. In an example, boot code 140 may store a successful command status in firmware mailbox 786. In an example, boot code 140 may save corresponding command parameters (in boot code mailbox 784) into corresponding regions in container header 310 (regions 433-434 and 437-440 in FIG. 4) and container content 311b (regions 501-502 and 505-515 in FIG. 5). Boot code 140 may use the following for the new signed owner container 302:

RPMC value 431 (and owner RPMC 503): may default to zero (because this is the first owner container). Boot code 140 may check if any bits of current RPMC value 202 in OTP memory are set and, if so, set these to the first valid, non-zero value.

Active container version 432: may default to zero.

Device serial number 435: may set to value stored in OTP serial number 205.

Owner transfer authorization key 504: may default to zero.

PUF activation code 621: may default to zero when processing the CREATE_CONTAINER_REQUEST command. Boot code 140 may generate and store PUF activation code 621 in signed owner container 302 following the next power cycle.

INCREMENT_RPMC_REQUEST Command

This signed command may be invoked to cause boot code 140 to increment the RPMC value 431 of the primary owner container 302 (without changing other container content). If permitted, boot code 140 may retrieve the primary owner container 302, increment the RPMC value 431, and reset active container version 432 back to zero. Boot code 140 may erase the primary and fallback containers stored in non-volatile memory 173 and store the updated owner container 302 in their place. Once both containers are updated successfully, the boot code may increment the current RPMC value 202 in OTP memory 110 which may revoke the previous containers.

In an example, boot code 140 may use command parameters stored in boot code mailbox 784 for the INCREMENT_RPMC_REQUEST command. Command parameters may include a container commands public key (CCKpub), an indication of which of CCK0-CCK3 (hashes in current owner container header 310 region 436) the CCKpub corresponds to, and a command signature signed with the container commands private key (CCKpriv). Before incrementing RPMC value 431, boot code 140 may verify the command signature using CCKpub. In an example, boot code 140 may verify command parameter CCKpub by computing its hash and comparing that to the corresponding CCKpub hash (CCK0-CCK3) stored in current owner container header 310. (Information in current owner container header 310 may be trusted because owner container 302 may be verified by boot code 140.) If verification of either CCKpub or the command signature fails, boot code 140 may stop execution of the INCREMENT_RPMC_REQUEST command without incrementing RPMC value 431. In an example, boot code 140 may store an unsuccessful command status in firmware mailbox 786.

If verification is successful, boot code 140 may increment RPMC value 431 as described above. In an example, boot code 140 may store a successful command status in firmware mailbox 786.

UPDATE_CONTAINER_REQUEST Command

This signed command may be invoked to cause boot code 140 to update the selected container and increment current RPMC value 202 in OTP memory 110. In an example, the specific update performed may be determined by a sub-command parameter of command parameters stored in boot code mailbox 784 for the UPDATE_CONTAINER_REQUEST command. In an example, sub-commands may include: (1) "key revocation and rollback protection" and (2) "transfer ownership".

In an example, boot code 140 may use command parameters stored in boot code mailbox 784 for the UPDATE_CONTAINER_REQUEST command. Command parameters may include a signature public key (CCKpub or OTAKpub), an indication of which of OTAKpub or CCK0-CCK3 (hashes in current owner container header 310 region 436) to use for verification, and a command signature signed with private key OTAKpriv or CCKpriv. Before updating owner container 302, boot code 140 may verify the command signature using OTAKpub or CCKpub (whichever is indicated for use). In an example, boot code 140 may verify command parameter CCKpub by computing its hash and comparing that to the corresponding CCKpub hash (CCK0-CCK3) stored in current owner container header 310. (Information in current owner container header 310 may be trusted because owner container 302 may be verified by boot code 140.) In another example, boot code 140 may verify command parameter OTAKpub by comparing it to the owner transfer authorization key 504 stored in current owner container content 311b. If verification of either (1) the selected OTAKpub or CCKpub key or (2) the command signature fails, boot code 140 may stop execution of the UPDATE_CONTAINER_REQUEST command without modifying the current owner container 302 or incrementing current RPMC value 202 in OTP memory 110. In an example boot code 140 may store an unsuccessful command status in firmware mailbox 786.

If (1) verification of both the selected OTAKpub or CCKpub key and the command signature is successful and (2) sub-command is "transfer ownership," boot code 104 may update signed owner container 302. In an example, boot code 140 may save command parameters (e.g., in boot code mailbox 784) corresponding to regions 433-434 and 437-440 in FIG. 4 (container header 310) and 501-502 and 505-515 in FIG. 6 (container content 311b) into corresponding regions in container header 310 and container content 311b of updated signed owner container 302. Boot code 140 may use the following defaults for the updated signed owner container 302:
 RPMC value 431 (and owner RPMC 503): may use {current RPMC value 202+1}.
 Active container version 432: may default to zero.
 Device serial number 435: may set to value stored in OTP serial number 205.
 Owner transfer authorization key 504: may default to zero.
 PUF activation code 621: may default to zero when processing the CREATE_CONTAINER_REQUEST command. Boot code 140 may generate and store PUF activation code 621 in signed owner container 302 following the next power cycle.

If (1) verification of both the selected OTAKpub or CCKpub key and the command signature is successful, (2) sub-command is "transfer ownership," and (3) both updated primary and fallback owner containers 302 are successfully written to non-volatile memory 173, boot code 104 may increment current RPMC value 202 in OTP memory 110. In an example, boot code 140 may store a successful command status in firmware mailbox 786.

If (1) verification of both the selected OTAKpub or CCKpub key and the command signature is successful and (2) sub-command is "key revocation and rollback protection," boot code 104 may process the key revocation and rollback protection request. In an example, boot code 140 may update one or both of TAGx image key revocation 508 and TAGx image rollback protection 509 in container content 311b of signed owner container 302. In an example, boot code 140 may store a successful command status in firmware mailbox 786.

REPAIR_FALLBACK_CONTAINER_REQUEST Command

This signed command may be invoked to cause boot code 140 to update the fallback container to match the primary container. If the primary container is valid and the fallback container does not match the primary container, boot code 140 may erase the fallback container and copy the primary container to the fallback container location. In an example, boot code 140 may use command parameters stored in boot code mailbox 784 for the REPAIR_FALLBACK_CONTAINER_REQUEST command. Command parameters may include a signature public key (CCKpub or OTAKpub), an indication of which of OTAKpub or CCK0-CCK3 (hashes in current owner container header 310 region 436) to use for verification, and a command signature signed with private key OTAKpriv or CCKpriv. The boot code may verify the signature public key and command signature for the REPAIR_FALLBACK_CONTAINER_REQUEST command using the same mechanisms disclosed for the UPDATE_CONTAINER_REQUEST (above). In an example, if verification succeeds and no errors are detected in updating the fallback container, matching primary and fallback containers may be stored in non-volatile memory 173 (e.g., SPI flash), and boot code 140 may store a successful command status in firmware mailbox 786. If verification fails or an error is detected, there may be no change (e.g., primary container is still valid in non-volatile memory 173 and fallback container is still invalid). In this latter example, boot code 140 may store an unsuccessful command status in firmware mailbox 786.

CRISIS_RECOVERY_REQUEST Command

This signed command may be invoked to cause boot code 140 to recover from the case where the primary and fallback containers are not valid. In an example, this command may be serviced when both containers are invalid. Boot code 140 may permit the owner to restore a saved copy of a working owner container using a crisis command (e.g., RESTORE OWNER CONTAINER) issued via I/O & port control 190 (e.g., I2C crisis port, UART crisis port).

ENABLE_UNRESTRICTED_TRANSFERS Command

This signed command may be invoked to cause boot code 140 to perform the following owner container 302 updates:
 Update owner configuration 501 (FIG. 5) so that both the current silicon owner and a new owner may transfer ownership of electronic device 101.
 Provision owner transfer authorization key 504.
 Increment active container version 432 (FIG. 4).
 Re-sign owner container 302.

In an example, boot code 140 may use command parameters stored in boot code mailbox 784 for the ENABLE_UNRESTRICTED_TRANSFERS command. Command parameters may include an OTAKpub public key (e.g., for provisioning owner transfer authorization key 504), a signature public key (CCKpub), an indication of which of CCK0-CCK3 (hashes in current owner container header 310 region 436) the CCKpub corresponds to, and a command signature signed with the container commands private key (CCKpriv). Before updating owner container 302, boot code 140 may verify the command signature using CCKpub. In an example, boot code 140 may verify command parameter CCKpub by computing its hash and comparing that to the corresponding CCKpub hash (CCK0-CCK3) stored in current owner container header 310. (Information in current owner container header 310 may be trusted because owner container 302 may be verified by boot code 140.) If verification of either CCKpub or the command signature fails, boot code 140 may stop execution of the ENABLE_UNRESTRICTED_TRANSFERS command without updating owner container 302. In an example, boot code 140 may store an unsuccessful command status in firmware mailbox 786.

If verification is successful, boot code 140 may perform updates to owner container 302 as described above (e.g., by updating both copies of the container in non-volatile memory (e.g., SPI flash)). In an example, boot code 140 may store a successful command status in firmware mailbox 786.

UPDATE_OTAK_KEY Command

This signed command may be invoked to cause boot code 140 to perform the following owner container 302 updates:

Provision owner transfer authorization key 504.
Increment active container version 432 (FIG. 4).
Re-sign owner container 302.

This signed command may allow an intermediate entity that has the OTAKpriv private key to cause the above updates. In an example, boot code 140 may ignore this command unless owner configuration 501 is configured to allow both the current silicon owner and a new owner to transfer ownership of electronic device 101 (e.g., unrestricted transfers have been enabled).

In an example, boot code 140 may use command parameters stored in boot code mailbox 784 for the UPDATE_OTAK_KEY command. Command parameters may include a new OTAKpub new public key (e.g., for provisioning owner transfer authorization key 504), a signature public key (CCKpub or OTAKpub), an indication of which of OTAKpub or CCK0-CCK3 (hashes in current owner container header 310 region 436) to use for verification, and a command signature signed with private key OTAKpriv or CCKpriv. Before updating owner container 302, boot code 140 may verify the command signature using OTAKpub or CCKpub (whichever is indicated for use). In an example, boot code 140 may verify command parameter CCKpub by computing its hash and comparing that to the corresponding CCKpub hash (CCK0-CCK3) stored in current owner container header 310. (Information in current owner container header 310 may be trusted because owner container 302 may be verified by boot code 140.) In another example, boot code 140 may verify command parameter OTAKpub by comparing it to the owner transfer authorization key 504 stored in current owner container content 311*b*. If verification of either (1) the selected OTAKpub or CCKpub key or (2) the command signature fails, boot code 140 may stop execution of the UPDATE_OTAK_KEY command without modifying the current owner container 302. In an example boot code 140 may store an unsuccessful command status in firmware mailbox 786.

If verification is successful, boot code 140 may perform updates to owner container 302 as described above (e.g., by updating both copies of the container in non-volatile memory (e.g., SPI flash)). In an example, boot code 140 may store a successful command status in firmware mailbox 786.

Ownership of Electronic Device

Electronic device 101 may have one or more owners over its lifetime and each owner may customize the images permitted to run on the machine. In an example, the OEM may be the first implicit owner (a "No Owner" state), and the OEM's configuration may be stored in OTP memory 110. The OEM may enable the part to support transfer of ownership by establishing the first owner container.

Establishing Ownership

During manufacturing, OTP memory 110 may be provisioned with OEM image configuration parameters, which may include KHB hash 507 used for authenticating OEM images stored in non-volatile memory 173 (e.g., SPI flash). Other parameters in OTP memory 110 (e.g., illustrated in FIG. 2 and FIG. 5) may also be provisioned by the OEM during manufacturing. This configuration may be referred to as the "Legacy Secure Boot" state. In this state, only the signed OEM images (e.g., FMB) may be authenticated and executed on the electronic device 101.

RPMC owner container 302 may be created by the OEM using the CREATE_CONTAINER_REQUEST command. The OEM may opt to use either the OTP memory configuration (e.g., FIG. 5) or an owner container configuration (OTP emulation) (e.g., FIG. 6).

The OEM owner container 302 may be created by authentic firmware loaded from non-volatile memory 173 (e.g., SPI flash) or via code loaded into volatile memory 172 (e.g., SRAM) via I/O & port control 190 (e.g., I2C crisis port, UART crisis port). The firmware may store the CREATE_CONTAINER_REQUEST command into boot code mailbox 784 (FIG. 7), set the RPMC Container Command 782 to indicate a pending request, and assert reset (e.g., soft reset).

Figure 8:
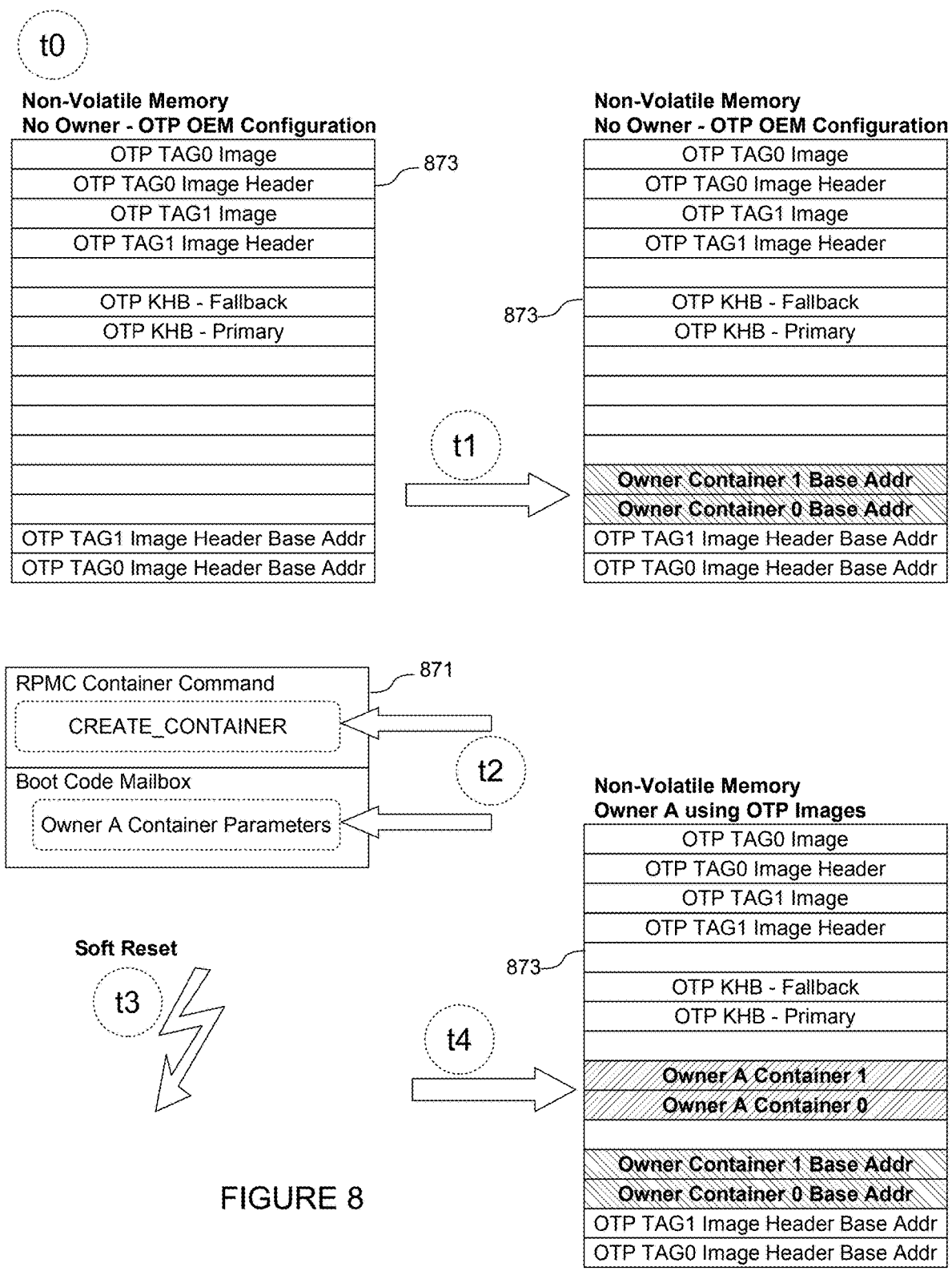
FIG. 8 illustrates a block diagram of an example of managing ownership of an electronic device, including by creating a first owner container using OEM signed images and OTP configuration.

FIG. 8 illustrates a block diagram of an example of managing ownership of an electronic device 101, including by creating a first owner container using OEM signed images and OTP configuration. Contents of non-volatile memory 873 (e.g., SPI flash) are shown at time t0 and includes: OTP TAG0/1 image header base addresses, OTP KHB (primary and fallback), and OTP TAG0/1 image headers and images (e.g., FMB). At time t0, there may be no owner of electronic device 101, although the OEM may be an implicit owner. In an example, at time t1, OEM application code may write owner container 0/1 base addresses into non-volatile memory 873. At time t2, OEM application code may store the CREATE_CONTAINER_REQUEST command to RPMC container command region in command memory 871 and may store the new owner's (Owner A) container parameters in boot code mailbox in command memory 871. In an example, the parameter corresponding to owner configuration parameter 501 may specify an OTP configuration for the Owner A. At time t3, OEM application code may cause a soft system reset of electronic device 101. During the boot process, boot code 140 may notice a pending CREATE_CONTAINER_REQUEST (e.g., in command memory 871) command and process the command. At time t4, if the command is successful, boot code 140 may write Owner A Containers 0/1 (primary and fallback containers) to non-volatile memory 873. As illustrated, after time t4, electronic device 101 may be owned by Owner A using OTP images. In an example, following time t4, OEM application may read command status bits from firmware mailbox 786 (FIG. 7) to verify successful completion of the command. OEM application may optionally read Owner A Containers 0/1 from non-volatile memory 873 and verify the content. In an example, OEM application may optionally save a copy of Owner A Containers 0/1 as a backup.

Figure 9:
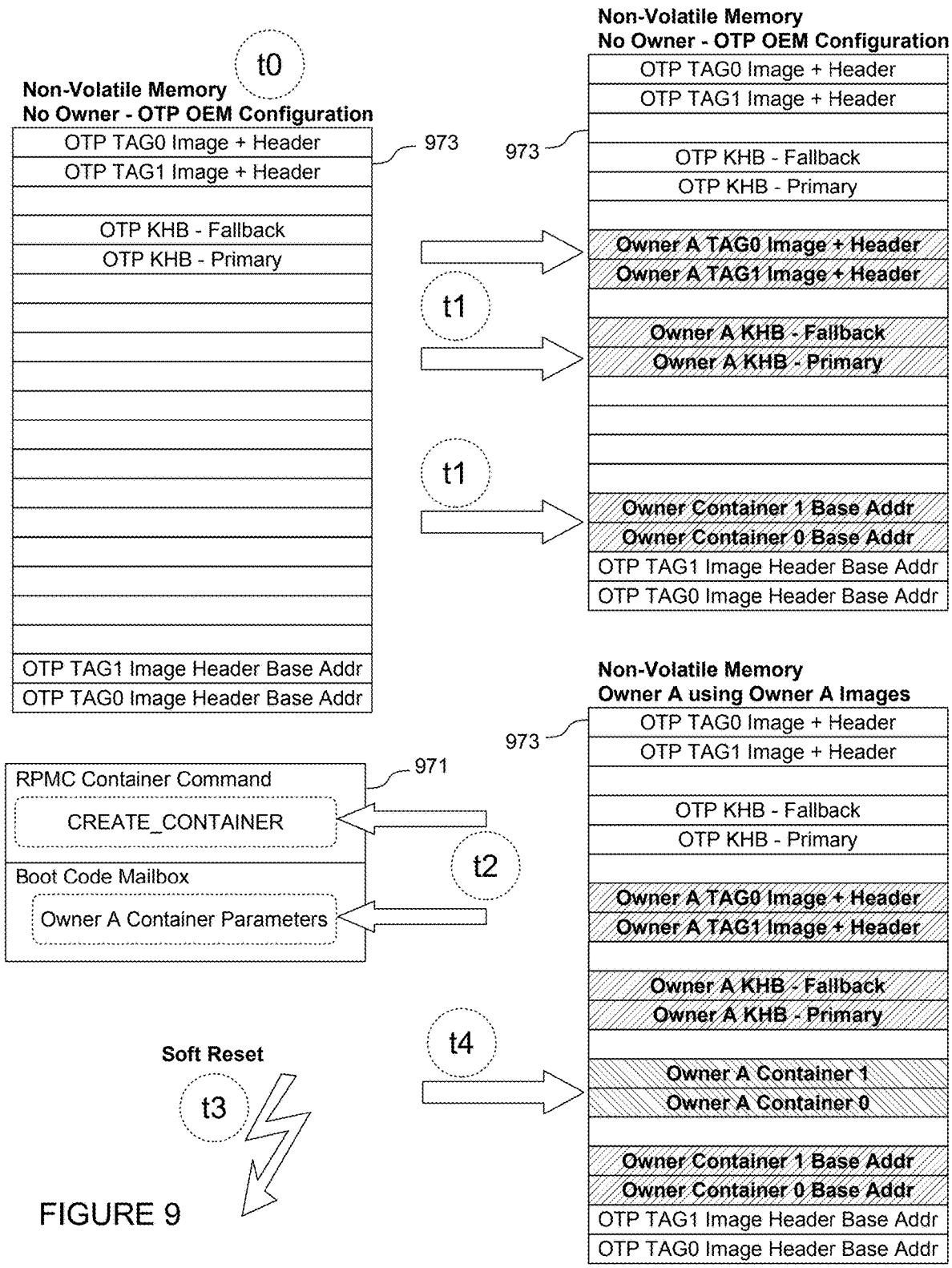
FIG. 9 illustrates a block diagram of an example of managing ownership of an electronic device, including by creating a first owner container using OEM signed images and OTP emulation configuration.

FIG. 9 illustrates a block diagram of an example of managing ownership of an electronic device 101, including by creating a first owner container using OEM signed images and OTP emulation configuration. Contents of non-volatile memory 973 (e.g., SPI flash) are shown at time t0 and includes: OTP TAG0/1 image header base addresses, OTP KHB (primary and fallback), and OTP TAG0/1 images+headers (e.g., FMB). At time t0, there may be no owner of electronic device 101, although the OEM may be an implicit owner. In an example, at time t1, OEM application code may write (1) owner container 0/1 base addresses, (2) Owner A KHBs (primary and fallback), and (3) Owner A TAG0/1 images+headers (e.g., FMB) into non-volatile memory 973. At time t2, OEM application code may store the CREATE_CONTAINER_REQUEST command to RPMC container command region in command memory 971 and may store the new owner's (Owner A) container parameters in boot code mailbox in command memory 971. In an example, the parameter corresponding to owner configuration parameter 501 may specify an OTP emulation configuration for Owner A. At time t3, OEM application code may cause a soft system reset of electronic device 101. During the boot process, boot code 140 may notice a pending CREATE_CONTAINER_REQUEST command and process the command. At time t4, if the command is successful, boot code 140 may write Owner A Containers 0/1 (primary and fallback containers) to non-volatile memory 973 and begin executing Owner A image (e.g., TAG0 image). As illustrated, after time t4, electronic device 101 may be owned by Owner A using Owner A images. In an example, following time t4, Owner A application may read command status bits from firmware mailbox 786 (FIG. 7) to verify successful completion of the command. Owner A application may optionally read Owner A Containers 0/1 from non-volatile memory 973 and verify the content. In an example, Owner A application may optionally save a copy of Owner A Containers 0/1 as a backup.

Boot Sequence for Electronic Device Having RPMC Owner Containers

Figure 10:
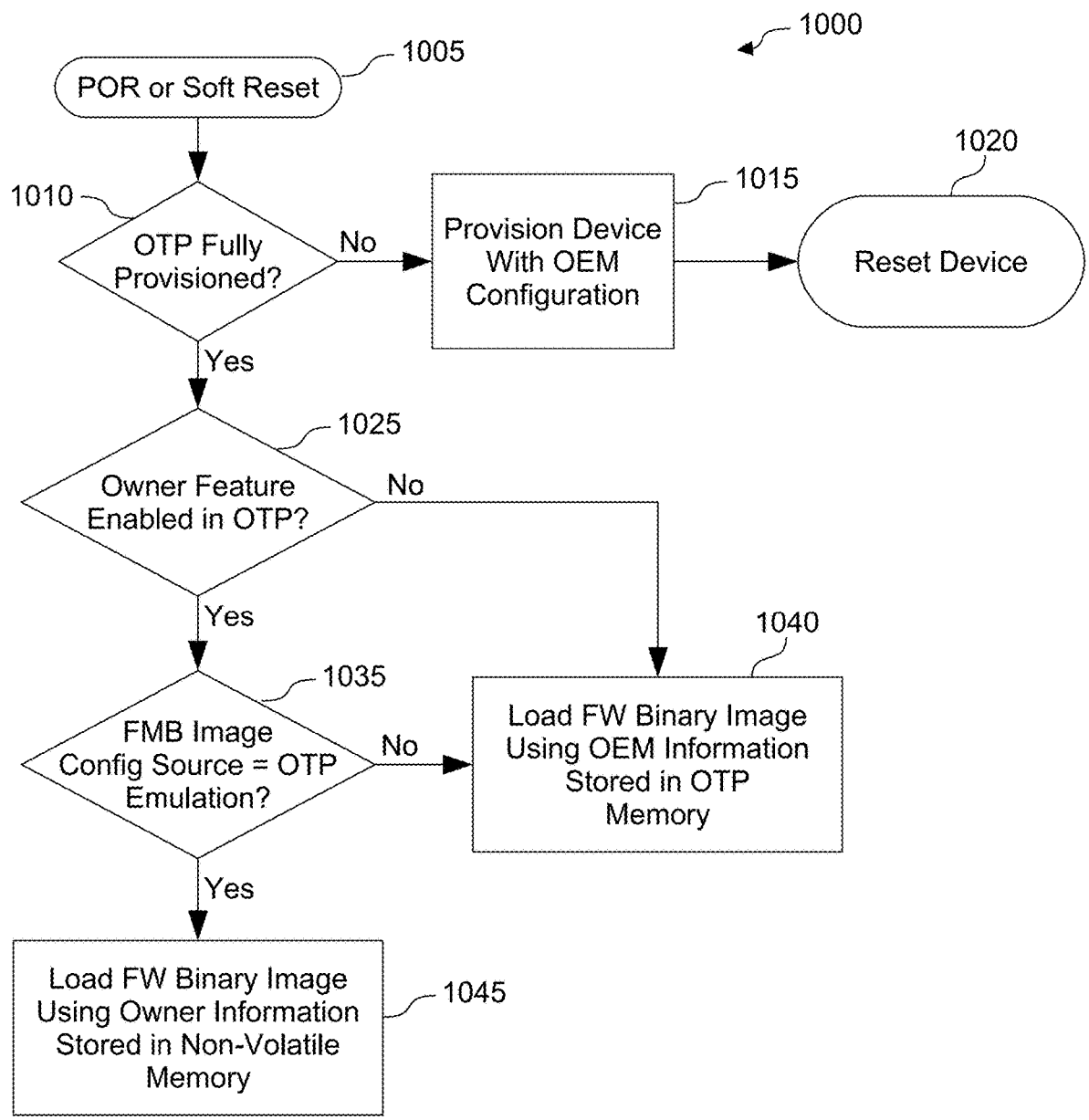
FIG. 10 illustrates a flow chart of an example method for managing ownership of an electronic device, including secure transfer of ownership of the electronic device, over time.

FIG. 10 illustrates a flow chart of an example method 1000 for managing ownership of an electronic device, including secure transfer of ownership of the electronic device, over time. According to one example, method 1000 may begin at block 1005. In an example, method 1000 may be performed by boot code 140. In some examples, starting block 1005 may represent a time when electronic device 101 is first powered up (POR) or a time following a reset of the electronic device (e.g., a device reset, a reboot, or a power cycle). Thus method 1000 may be performed by boot code 140 at a time when OTP memory 110 is not user-accessible (e.g., because user code has not yet been loaded). Teachings of the present disclosure may be implemented in a variety of configurations of system 100. As such, the initialization point for method 1000 and the order of 1005-1045 comprising method 1000 may depend on the implementation chosen.

Following a POR or soft reset, boot code may proceed to block 1010 where it determines whether OTP memory has been fully provisioned. If not, boot code may proceed to block 1015, provision electronic device 101 with the OEM configuration, and then proceed to block 1020 and reset electronic device 101.

If boot code determines in block 1010 that the OTP memory is fully provisioned, it may proceed to block 1025 where it may determine whether the owner feature is enabled in OTP memory 110. In an example, this feature may be disabled by default (i.e., at the time of manufacture). If the owner feature is not enabled, boot code may proceed to block 1040 where it may load the firmware binary image using OEM information stored in OTP memory 110. At block 1040, the OEM may be the implicit owner of electronic device 101 because only OEM signed firmware may be loaded and executed (may also be referred to as "Legacy Secure Boot"). In an example, OEM firmware may enable the owner feature by issuing the CREATE_CONTAINER_REQUEST command (e.g., illustrated in FIG. 8 and FIG. 9). If boot code determines at block 1025 that the owner feature is enabled in OTP memory 110, boot code may proceed to block 1035 where it may determine whether the FMB image configuration source is OTP emulation. If the FMB image configuration source is not OTP emulation, the image configuration source may be OTP memory. In this example, boot code may proceed to block 1040 for Legacy Secure Boot. If boot code determines at block 1035 that the FMB configuration image source is OTP emulation, boot code may proceed to block 1045 where it may attempt to load firmware using RPMC owner container information stored in non-volatile memory 173 (e.g., SPI flash). In an example, block 1045 may represent a secure boot process using RPMC owner containers stored in non-volatile memory 173.

Although FIG. 10 discloses a particular number of operations related to method 1000, method 1000 may be executed with greater or fewer operations than those depicted in FIG. 10. In addition, although FIG. 10 discloses a certain order of operations to be taken with respect to method 1000, the operations comprising method 1000 may be completed in any suitable order.

Transferring Ownership of an Electronic Device

In an example, an OEM may be the first silicon owner (e.g., owner of electronic device 101). However, owners may change one or more times over the life of the electronic device. The owner is the entity who may determine the keys used to authenticate the FMB images. Transfer of ownership may be the act of changing the entity responsible for determining the FMB signing keys.

In an example, an owner may opt to use RPMC owner containers 302 with either the OTP configuration (using OEM images) (e.g., FIG. 5) or owner defined configuration (using owner images) (e.g., FIG. 6). New owner containers 302 may be created by authentic firmware loaded from non-volatile memory 173 (e.g., SPI flash) or via I/O & port control 190 (e.g., I2C crisis port, UART crisis port) by executing the UPDATE_CONTAINER_REQUEST command for transfer of ownership. According to an example, this command may be supported when the current owner enables unrestricted transfers of ownership by executing the ENABLE_UNRESTRICTED_TRANSFERS command.

In some examples, there may be three types of ownership transfers:
  Current owner performs the transfer to the new owner.
  Trusted intermediate entity performs the transfer to the new owner (unrestricted transfers).
  Current owner enables the new owner to claim ownership (unrestricted transfers).

Using its CCK keys, the current owner of electronic device 101 may transfer ownership to a new owner if the new owner is willing to provide its information to the current owner. In another example, the current owner may use its CCK keys to return the system to the OEM/refurbished state. This latter type of transfer may be simplified if the OEM images and configuration information are retained in non-volatile memory 173 (e.g., SPI flash). In an example, boot code 140 may not load the OEM images unless the current owner transfers ownership to use the OEM images.

The Owner Transfer Authorization Key (OTAK) may support a one-time transfer of ownership to a new owner while avoiding providing the new owner's information to the current owner. Using the OTAK transfer (which may be referred to as an "unrestricted transfer"), the new owner may upload its information and complete the ownership transfer as long as the current owner enabled the OTAK transfer. The OTAK ownership transfer may be completed where the new owner may or may not be present at the time the current owner relinquishes the machine.

Figure 12:
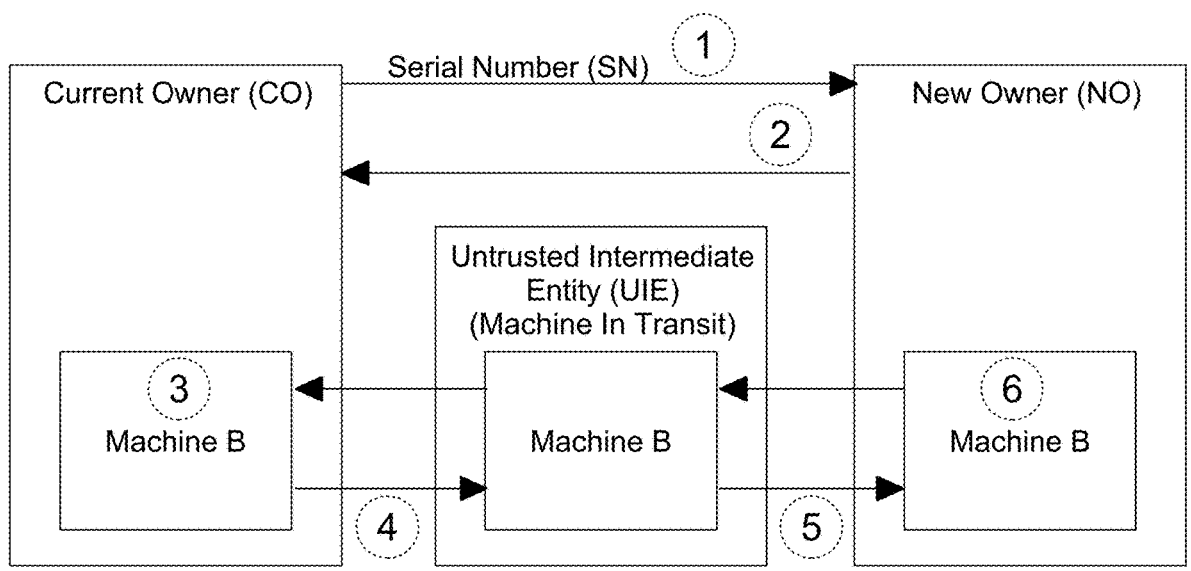

FIG. 11 and FIG. 12 illustrate block diagrams of two examples of managing ownership of an electronic device 101 using an unrestricted transfer and OTAK. As illustrated in FIG. 11, current owner (CO) may want to transfer ownership of Machine A to a new owner (NO). In an example, the current owner may rely on a trusted intermediate entity (TIE) (e.g., a sales distribution channel) to assist in transferring ownership to the new owner. In an example, the following events (1-8) may occur during the transfer.

1—CO may send Machine A serial number to TIE and NO (if NO is known). TIE and NO may use the serial number to confirm they receive the correct equipment (e.g., Machine A).
2—TIE may send OTAKpub1 key to CO. OTAKpub1 key may be a public key of a public/private key pair owned by TIE.
3—CO may run ENABLE_UNRESTRICTED_TRANSFERS command, passing OTAKpub1 key as the new OTAK public key for Machine A.
4—CO may send Machine A to TIE.
5—NO may send OTAKpub2 key to TIE. OTAKpub2 key may be a public key of a public/private key pair owned by NO.
6—TIE may run UPDATE_OTAK_KEY command, passing OTAKpub2 key as the new OTAK public key for Machine A. Because UPDATE_OTAK_KEY is a signed command, TIE may sign the command with TIE's OTAKpriv1 private key. TIE may use I/O & port control 190 (e.g., I2C crisis port, UART crisis port) to insert UPDATE_OTAK_KEY command into command memory 171 (e.g., FIG. 7).
7—TIE may send Machine A to NO.
8—NO may run UPDATE_CONTAINER_REQUEST with "transfer ownership" sub-command. Because UPDATE_CONTAINER_REQUEST is a signed command, NO may sign the command with NO's OTAKpriv2 private key. NO may use I/O & port control 190 (e.g., I2C crisis port, UART crisis port) to insert UPDATE_CONTAINER_REQUEST command into command memory 171 (e.g., FIG. 7).

Although FIG. 11 discloses a particular number of events related to an unrestricted ownership transfer, this type of transfer may be executed with greater or fewer events than those depicted in FIG. 11. For example, CO may not send the serial number to either or both of TIE and NO. In addition, although FIG. 11 discloses a certain order of events, the events may be completed in any suitable order.

As illustrated in FIG. 12, current owner (CO) may want to transfer ownership of Machine B to a new owner (NO). In an example, the transfer may use an untrusted intermediate entity (UIE) to assist in transferring ownership to the new owner. In an example, the following events (1-6) may occur during the transfer.

1—CO may send Machine B serial number to NO. NO may use the serial number to confirm it received the correct equipment (e.g., Machine B).
2—NO may send OTAKpub3 key to CO. OTAKpub3 key may be a public key of a public/private key pair owned by NO.
3—CO may run ENABLE_UNRESTRICTED_TRANSFERS command, passing OTAKpub3 key as the new OTAK public key for Machine B.
4—CO may send Machine B to UIE. Note that UIE may not assume ownership or run commands on Machine B because UIE does not have access to OTAKpriv3.
5—UIE may forward Machine B to NO (as is).
6—NO may run UPDATE_CONTAINER_REQUEST with "transfer ownership" sub-command. Because UPDATE_CONTAINER_REQUEST is a signed command, NO may sign the command with NO's OTAKpriv3 private key. NO may use I/O & port control 190 (e.g., I2C crisis port, UART crisis port) to insert UPDATE_CONTAINER_REQUEST command into command memory 171 (e.g., FIG. 7).

Although FIG. 12 discloses a particular number of events related to an unrestricted ownership transfer, this type of transfer may be executed with greater or fewer events than those depicted in FIG. 12. For example, CO may not send the serial number to NO. In another example, CO may send Machine B to NO directly, without the need for an intermediate entity. In addition, although FIG. 12 discloses a certain order of events, the events may be completed in any suitable order.

As illustrated in FIG. 11 and FIG. 12, if an intermediate entity is required and the end owner is unknown, each temporary owner may have their own OTAK key. If an intermediate entity is required and the end owner is known, the end owner may supply their OTAK public key preventing the intermediate entities from taking ownership or altering the OTAK key. The current owner may retain ownership until the owner transfer is complete. This allows the current owner to handle any issues that arise during transfer of ownership.

Figure 13:
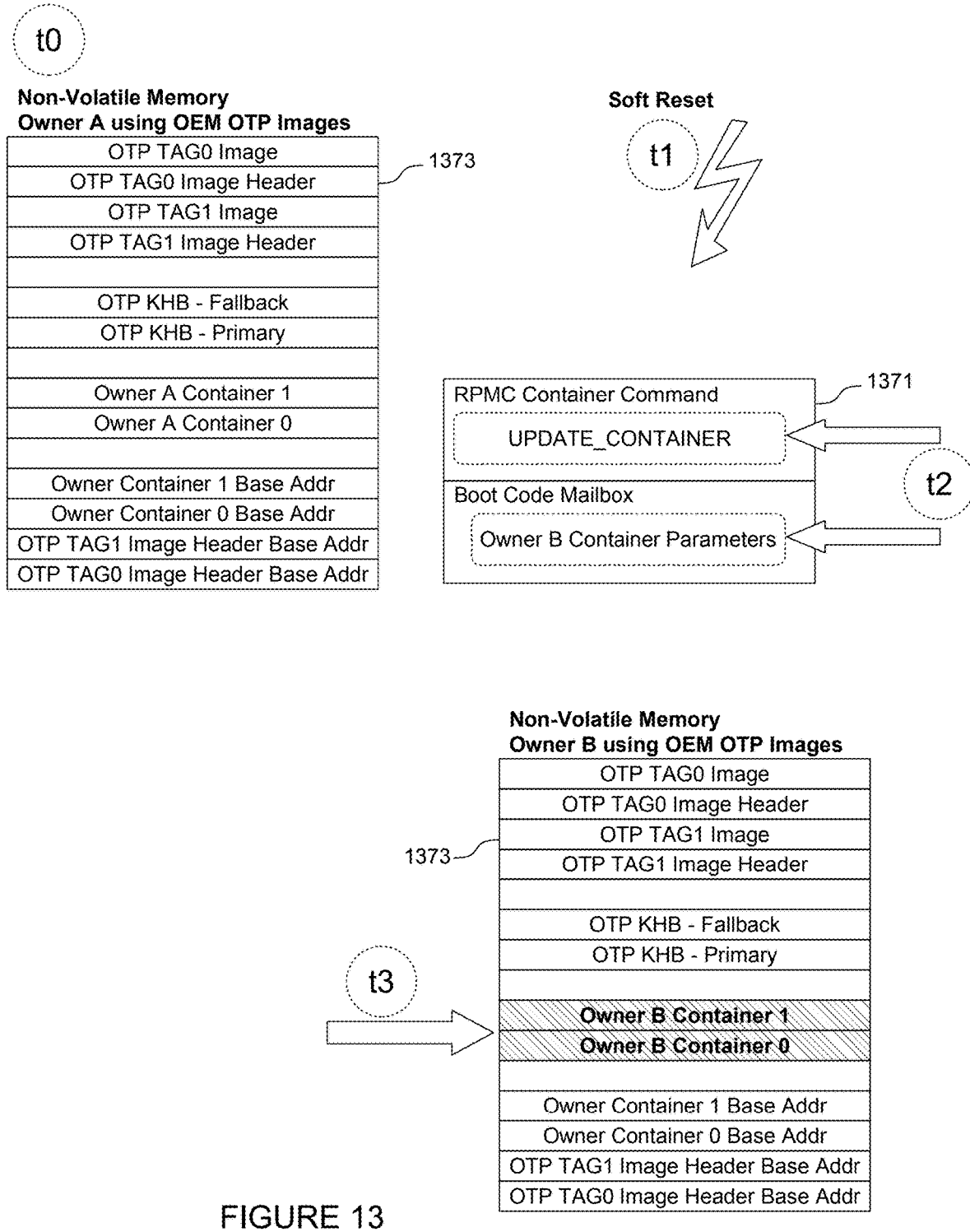
FIG. 13 illustrates a block diagram of an example of managing ownership of an electronic device, including by transferring ownership using a current owner's container command (CCK) key and a first mutable binary (FMB) configuration stored in OTP memory.

In an example, there may be six scenarios for transferring ownership of electronic device 101:

Direct ownership transfer using current owner's CCK key and FMB configuration=OTP (FIG. 13).
Direct ownership transfer using current owner's CCK key and FMB configuration=OTP emulation.
Direct ownership transfer using new owner's OTAK key and FMB configuration=OTP.
Direct ownership transfer using new owner's OTAK key and FMB configuration=OTP emulation.
Indirect ownership transfer using intermediate entity, OTAK keys, and FMB configuration=OTP.
Indirect ownership transfer using intermediate entity, OTAK keys, and FMB configuration=OTP emulation.

In an example where the ownership transfer command was successful, the new owner may load and execute code via I/O & port control 190 (e.g., a crisis port). This loaded code may be used to update the SPI flash images.

Transfer Procedure Using CCK Keys

FIG. 13 illustrates a block diagram of an example of managing ownership of an electronic device 101, including by transferring ownership using current owner's CCK key and FMB configuration=OTP. Contents of non-volatile memory 1373 (e.g., SPI flash) are shown at time t0 and includes: OTP TAG0/1 image header base addresses, OTP KHB (primary and fallback), OTP TAG0/1 image headers and images (e.g., FMB), owner container 0/1 base address, and owner A container 0/1. At time t0, owner A may be the owner of electronic device 101. The new owner may provide its owner configuration parameters to current owner and the current owner may sign the UPDATE_CONTAINER_REQUEST ("transfer ownership" sub-command) command parameters for the new owner using the current owner's CCK key (e.g., using an external hardware security module). In an example, the signed parameters may then be used by either the new owner or the current owner to perform the ownership transfer. At time t1, a soft system reset of electronic device 101 may cause it to enter crisis recovery mode. At time t2, either the new owner or the old owner may use the crisis port (e.g., I2C, UART) to issue the signed UPDATE_CONTAINER_REQUEST command. At time t3, if the command is successful, boot code 140 may write owner B Containers 0/1 (primary and fallback containers) to non-volatile memory 1373. As illustrated, after time t3, electronic device 101 may be owned by owner B using OEM OTP images.

FIG. 13 illustrates transferring ownership using current owner's CCK key and FMB configuration=OTP. The process may be similar when FMB configuration=OTP emulation. For OTP emulation, after issuing the UPDATE_CONTAINER_REQUEST, the owner may use the crisis port to load the new owner's loader code image and KHB into volatile memory 172 (e.g., SRAM (FIG. 1)). On a load success (t3), boot code 140 may write owner B Containers 0/1 (primary and fallback containers) to non-volatile memory 1373 and jump into the new owner's loader code. Subsequently, the new owner's loader code may write signed images and KHB (primary and fallback) to non-volatile memory 1373 (e.g., SPI flash).

Thus, the general procedure for ownership transfers using CCK keys may include:
- The new owner may provide their owner configuration parameters to the current owner.
- The current owner may sign the transfer ownership command parameters for the new owner.
- (optional) The current owner may enable crisis mode for restricted signing.
- (optional) The current owner may erase their images and KHB (if applicable).
- Electronic device may be powered off and physically transferred to the new owner or trusted intermediate entity.
- The new owner may issue the transfer ownership command using the crisis port.
- (for OTP emulation) The new owner may use the crisis port to load the new owner's loader code image and KHB which will write signed images and KHB (primary and fallback) to the non-volatile memory.

Transfer Procedure Using OTAK Keys

Examples of transferring ownership using the OTAK key are discussed above for FIG. 11 and FIG. 12. The general procedure for ownership transfers using OTAK keys may include:
- The new owner or trusted intermediate entity may generate a public/private ECDSA-384 key pair.
- The public ECDSA key may be transferred to the current owner offline via a trusted channel.
- The current owner may store this public key value to the OTAK key in the owner container and enable unrestricted transfer of ownership using the ENABLE_UNRESTRICTED_TRANSFERS command.
- (optional) The current owner may write new owner images and KHB to flash.
- (optional) The current owner may erase their images and KHB.
- The machine may be powered off and physically transferred to the new owner or trusted entity.
- (optional) If using a trusted intermediate entity, execute (via crisis port) UPDATE_OTAK_KEY command or UPDATE_CONTAINER_REQUEST command (with "transfer ownership" sub-command) using the intermediate entity's OTAK key.
- New owner may execute (via crisis port) UPDATE_CONTAINER_REQUEST command (with "transfer ownership" sub-command).
- (for OTP emulation) The new owner may use the crisis port to load the new owner's loader code image and KHB which will write signed images and KHB (primary and fallback) to the non-volatile memory.

In an example, if the transfer ownership command executed successfully, the new owner may load and execute code via the same crisis port.

Locating Owner Containers

In an example, boot code 140 may be allocated the first 16 bytes in SPI Flash memory of component 0 by default for the boot ROM address pointer table. This 16-byte address pointer table may be relocatable. The table may be used for locating owner images and may be remappable in OTP memory. The location of the primary RPMC owner container base address and fallback RPMC owner container base address are stored in the last 8 bytes of the address pointer table.

RPMC Value in OTP Memory and Owner Containers

In an example, current RPMC value 202 in OTP memory 110 may match RPMC value 431 in container header 310 of the current owner container 302. During updates (e.g., UPDATE_CONTAINER_COMMAND request), RPMC value 431 in container header 310 may be incremented by one indicating a container update is in progress. If the update is successful, current RPMC value 202 in OTP memory 110 may be incremented to match RPMC value 431 in the updated container header 310.

Ownership Transfer Methods

Figure 14:
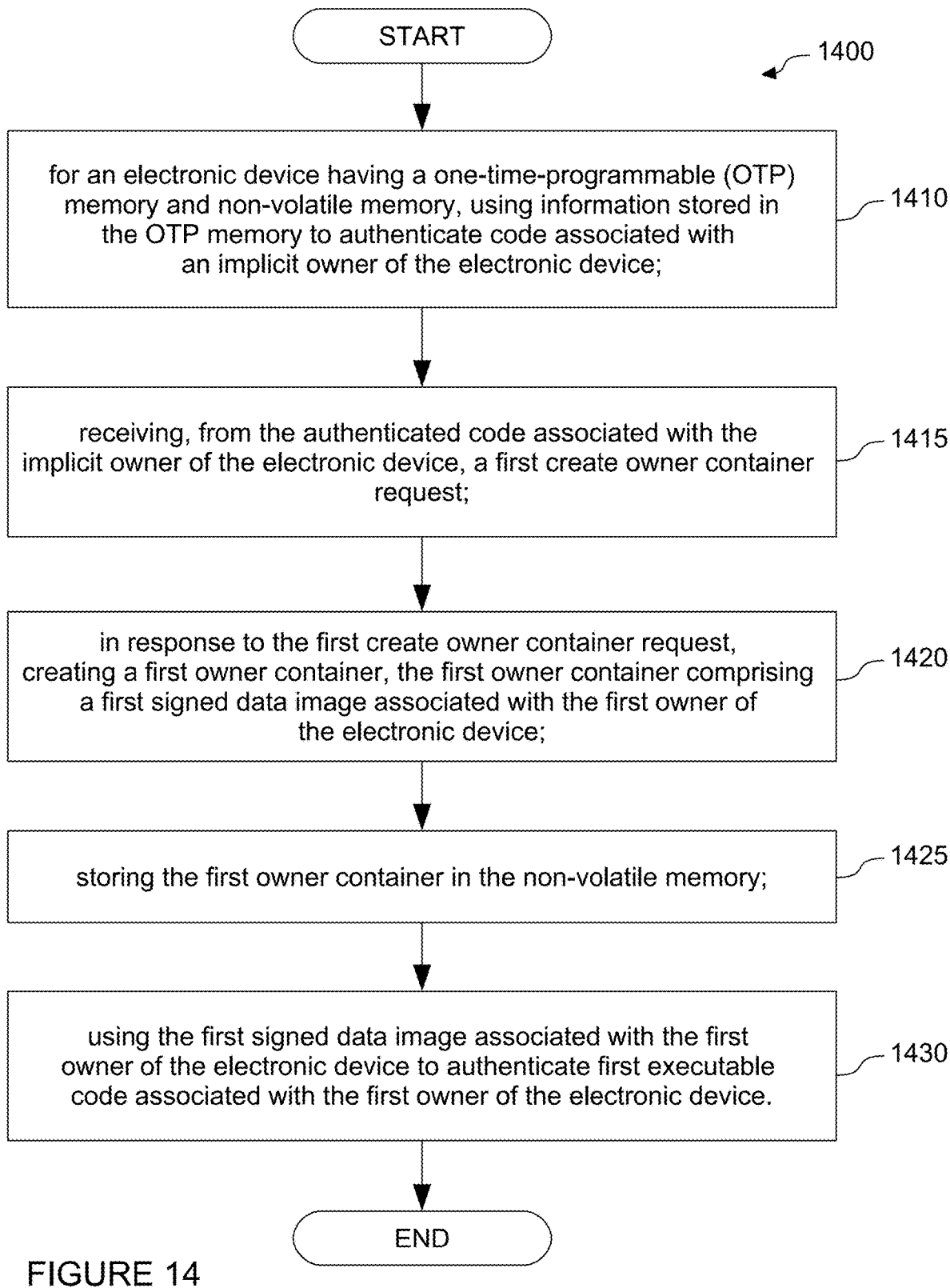
FIG. 14 illustrates a flow chart of an example method for managing ownership of an electronic device, including secure transfer of ownership of the electronic device, over time.

FIG. 14 illustrates a flow chart of an example method 1400 for managing ownership of an electronic device, including secure transfer of ownership of the electronic device, over time. According to one example, method 1400 may begin at block 1410. Teachings of the present disclosure may be implemented in a variety of configurations of system 100. As such, the initialization point for method 1400 and the order of 1410-1430 comprising method 1400 may depend on the implementation chosen.

At block 1410, for an electronic device having a one-time-programmable (OTP) memory and non-volatile memory, method 1400 may use information stored in the OTP memory to authenticate code associated with an implicit owner of the electronic device. At block 1415, method 1400 may receive, from the authenticated code associated with the implicit owner of the electronic device, a first create owner container request. At block 1420, method 1400 may, in response to the first create owner container request, create a first owner container, the first owner container comprising a first signed data image associated with the first owner of the electronic device. At block 1425, method 1400 may store the first owner container in the non-volatile memory. At block 1430, method 1400 may use the first signed data image associated with the first owner of the electronic device to authenticate first executable code associated with the first owner of the electronic device. In an example, method 1400 may use configuration information and secret information from the signed data image associated with the first owner of the electronic device to authenticate the first executable code associated with the first owner of the electronic device.

Although FIG. 14 discloses a particular number of operations related to method 1400, method 1400 may be executed with greater or fewer operations than those depicted in FIG. 14. For example, method 1400 may additionally authenticate the first create owner container request using a public key. In another example, after block 1430, method 1400 may continue with additional operations illustrated in FIG. 15. In addition, although FIG. 14 discloses a certain order of operations to be taken with respect to method 1400, the operations comprising method 1400 may be completed in any suitable order.

Figure 15:
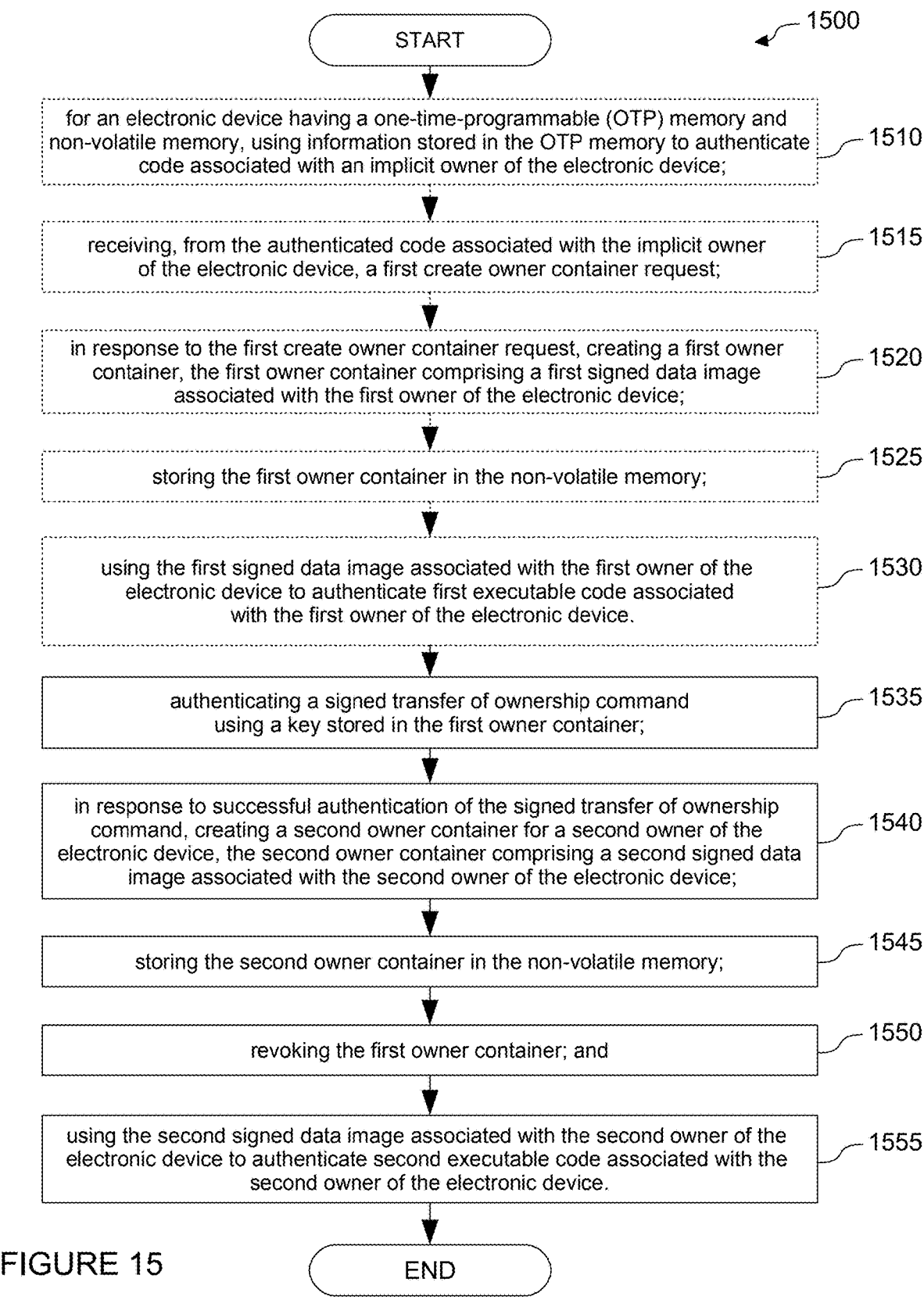
FIG. 15 illustrates a flow chart of an example method for managing ownership of an electronic device, including secure transfer of ownership of the electronic device, over time.

FIG. 15 illustrates a flow chart of an example method 1500 for managing ownership of an electronic device, including secure transfer of ownership of the electronic device, over time. According to one example, method 1500 may begin at block 1510. Teachings of the present disclosure may be implemented in a variety of configurations of system 100. As such, the initialization point for method 1500 and the order of 1510-1555 comprising method 1500 may depend on the implementation chosen.

According to an example, blocks 1510-1530 (dotted outlines) may be the same as blocks 1410-1430 in FIG. 14. At block 1535, method 1500 may authenticate a signed transfer of ownership command using a key stored in the first owner container. At block 1540, method 1500 may, in response to successful authentication of the signed transfer of ownership command, create a second owner container for a second owner of the electronic device, the second owner container comprising a second signed data image associated with the second owner of the electronic device. At block 1545, method 1500 may store the second owner container in the non-volatile memory. At block 1550, method 1500 may revoke the first owner container. According to an example, revoking the first owner container comprises programming a bit in the OTP memory corresponding to the second owner container. At block 1555, method 1500 may use the second signed data image associated with the second owner of the electronic device to authenticate second executable code associated with the second owner of the electronic device.

Although FIG. 15 discloses a particular number of operations related to method 1500, method 1500 may be executed with greater or fewer operations than those depicted in FIG. 15. In addition, although FIG. 15 discloses a certain order of operations to be taken with respect to method 1500, the operations comprising method 1500 may be completed in any suitable order.

Methods 1000, 1400, and 1500 may be implemented using system 100 or any other system operable to implement methods 1000, 1400, and 1500. Although examples have been described above, other variations and examples may be made from this disclosure without departing from the spirit and scope of these disclosed examples.

The invention claimed is:

1. A system, comprising:
an electronic device having:
a one-time-programmable (OTP) memory;
a boot code;
a volatile memory; and
a non-volatile memory;
the boot code executable by a processor to:
use information stored in the OTP memory to authenticate code associated with an implicit owner of the electronic device;
receive, from the authenticated code associated with the implicit owner of the electronic device, a first create owner container request;
in response to the first create owner container request, create a first owner container for a first owner of the electronic device, the first owner container comprising a first signed data image associated with the first owner of the electronic device;
store the first owner container in the non-volatile memory;
use the first signed data image associated with the first owner of the electronic device to authenticate first executable code associated with the first owner of the electronic device; and
perform a transfer of ownership from the first owner of the electronic device to a second owner of the electronic device, the boot code executable by the processor to:
authenticate a signed transfer of ownership command using a key stored in the first owner container;
create a second owner container in response to successful authentication of the signed transfer of ownership command, the second owner container comprising a second signed data image associated with the second owner of the electronic device;
store the second owner container in the non-volatile memory;
revoke the first owner container; and
use the second signed data image associated with the second owner of the electronic device to authenticate second executable code associated with the second owner of the electronic device.

2. The system of claim 1, wherein the boot code comprises immutable code stored in a read-only memory.

3. The system of claim 1, wherein the boot code comprises authenticated code stored in the non-volatile memory or authenticated code stored in the volatile memory.

4. The system of claim 1, wherein:
the first signed data image associated with the first owner of the electronic device includes configuration information and secret information; and
the boot code executable by the processor to use the first signed data image associated with the first owner of the electronic device to authenticate the first executable code associated with the first owner of the electronic device comprises the boot code executable by the processor to use the configuration information and secret information to authenticate the first executable code associated with the first owner of the electronic device.

5. The system of claim 1, wherein:
the first create owner container request comprises a signed request; and
the boot code is executable by the processor to authenticate, using a public key, the first create owner container request.

6. The system of claim 1, wherein the first owner container includes:
a container header;
container content including owner configuration information associated with the first owner of the electronic device, and an owner transfer authorization key; and
a container signature.

7. The system of claim 6, wherein the container header comprises a replay protected monotonic counter (RPMC).

8. The system of claim 1, wherein the boot code executable by the processor to store the first owner container in the non-volatile memory comprises the boot code executable by the processor to store two copies of the first owner container in the non-volatile memory.

9. The system of claim 8, wherein the boot code is executable by the processor to provide an indication that ownership is established in response to a confirmation that the two copies of the first owner container are successfully stored in the non-volatile memory.

10. The system of claim 1, wherein the non-volatile memory comprises a serial peripheral interface (SPI) flash memory or electrically erasable programmable read-only memory (EEPROM).

11. The system of claim 1, wherein revoking the first owner container comprises programming a bit in the OTP memory corresponding to the second owner container.

12. A method, comprising:
for an electronic device having a one-time-programmable (OTP) memory and non-volatile memory, using information stored in the OTP memory to authenticate code associated with an implicit owner of the electronic device;

receiving, from the authenticated code associated with the implicit owner of the electronic device, a first create owner container request;

in response to the first create owner container request, creating a first owner container, the first owner container comprising a first signed data image associated with the first owner of the electronic device;

storing the first owner container in the non-volatile memory;

using the first signed data image associated with the first owner of the electronic device to authenticate first executable code associated with the first owner of the electronic device; and performing a transfer of ownership from the first owner of the electronic device to a second owner of the electronic device by:

authenticating a signed transfer of ownership command using a key stored in the first owner container;

in response to successful authentication of the signed transfer of ownership command, creating a second owner container for a second owner of the electronic device, the second owner container comprising a second signed data image associated with the second owner of the electronic device;

storing the second owner container in the non-volatile memory;

revoking the first owner container; and using the second signed data image associated with the second owner of the electronic device to authenticate second executable code associated with the second owner of the electronic device.

13. The method of claim 12, wherein revoking the first owner container comprises programming a bit in the OTP memory corresponding to the second owner container.

14. The method of claim 12, comprising:
authenticating the first create owner container request using a public key.

15. The method of claim 12, wherein using the first signed data image associated with the first owner of the electronic device to authenticate the first executable code associated with the first owner of the electronic device comprises using configuration information and secret information from the signed data image associated with the first owner of the electronic device to authenticate the first executable code associated with the first owner of the electronic device.

16. A system, comprising:
an electronic device having:
a one-time programmable (OTP) memory, the OTP memory including configuration information corresponding to an implicit owner of the electronic device;
an immutable boot code stored in read-only memory; and
a non-volatile memory;
the immutable boot code executable by a processor to:
determine whether a first owner container exists in the non-volatile memory;
in response to determining the first owner container does not exist in the non-volatile memory:
prohibit loading executable code that cannot be authenticated using the configuration information corresponding to the implicit owner of the electronic device;
authenticate, using the configuration information corresponding to the implicit owner of the electronic device, first executable code associated with the implicit owner of the electronic device;

load the authenticated first executable code associated with the implicit owner of the electronic device;

receive, from the authenticated executable code associated with the implicit owner of the electronic device, a first create owner container request;

create the first owner container in response to the first create owner container request, the first owner container comprising a first signed data image associated with a first owner of the electronic device; and store the first owner container in the non-volatile memory; and in response to determining the first owner container exists in the non-volatile memory:

prohibit loading executable code that cannot be authenticated using the first signed data image associated with the first owner of the electronic device;

authenticate, using the first signed data image associated with the first owner of the electronic device, first executable code associated with the first owner of the electronic device; and load the authenticated first executable code associated with the first owner of the electronic device; and perform a transfer of ownership process from the first owner of the electronic device to a second owner of the electronic device, including the immutable boot code executable by the processor to:

authenticate a signed transfer of ownership command using a key stored in the first owner container;

create a second owner container for the second owner of the electronic device in response to successful authentication of the signed transfer of ownership command, the second owner container comprising a second signed data image associated with the second owner of the electronic device;

store the second owner container in the non-volatile memory;

revoke the first owner container; and use the second signed data image associated with the second owner of the electronic device to authenticate second executable code associated with the second owner of the electronic device.

17. The system of claim 16, wherein:
the first signed data image associated with a first owner of the electronic device includes configuration information and secret information; and
the immutable boot code executable by the processor to authenticate the first executable code associated with the first owner of the electronic device comprises the immutable boot code executable by the processor to authenticate, using the configuration information and secret information, the first executable code associated with the first owner of the electronic device.

18. The system of claim 16, wherein the immutable boot code is executable by the processor to determine whether the second owner container exists in the non-volatile memory and in response to determining the second owner container exists in the non-volatile memory:

prohibit loading executable code that cannot be authenticated using the second signed data image associated with the second owner of the electronic device;

authenticate, using the second signed data image associated with the second owner of the electronic device, second executable code associated with the second owner of the electronic device; and load the authenticated second executable code associated with the second owner of the electronic device.

19. The system of claim 16, wherein:

the OTP memory includes a current container replay protected monotonic counter (RPMC) field;

the first signed data image associated with the first owner of the electronic device includes a container header RPMC field; and the immutable boot code executable by the processor to authenticate the first executable code associated with the first owner of the electronic device comprises the immutable boot code executable by the processor to authenticate, by ensuring the current container RPMC field and the container header RPMC field both have the same value, the first executable code associated with the first owner of the electronic device.

* * * * *